(12) United States Patent
Flynn

(10) Patent No.: US 9,674,538 B2
(45) Date of Patent: Jun. 6, 2017

(54) METHODS FOR RECONSTRUCTING AN ENCODED VIDEO AT A BIT-DEPTH LOWER THAN AT WHICH IT WAS ENCODED

(71) Applicant: BlackBerry Limited, Waterloo (CA)

(72) Inventor: David Flynn, Kitchener (CA)

(73) Assignee: BlackBerry Limited, Waterloo (CA)

( * ) Notice: Subject to any disclaimer, the term of this patent is extended or adjusted under 35 U.S.C. 154(b) by 646 days.

(21) Appl. No.: 13/858,852

(22) Filed: Apr. 8, 2013

(65) Prior Publication Data
US 2014/0301448 A1    Oct. 9, 2014

(51) Int. Cl.
  H04N 19/30   (2014.01)
  H04N 19/61   (2014.01)
  H04N 19/124  (2014.01)

(52) U.S. Cl.
  CPC .......... *H04N 19/30* (2014.11); *H04N 19/124* (2014.11); *H04N 19/61* (2014.11)

(58) Field of Classification Search
  None
  See application file for complete search history.

(56) References Cited

U.S. PATENT DOCUMENTS

| | | | | |
|---|---|---|---|---|
| 6,195,391 | B1* | 2/2001 | Hancock | H04N 19/00 375/240 |
| 2003/0099291 | A1* | 5/2003 | Kerofsky | H03M 7/24 375/240.05 |
| 2006/0088106 | A1* | 4/2006 | Winger | H04N 19/105 375/240.24 |
| 2006/0257034 | A1* | 11/2006 | Gish | H04N 19/61 382/239 |
| 2007/0081734 | A1* | 4/2007 | Sullivan | G06F 17/147 382/250 |
| 2008/0075166 | A1* | 3/2008 | Gish | H04N 19/44 375/240.13 |
| 2008/0175496 | A1* | 7/2008 | Segall | G06T 5/009 382/238 |
| 2009/0087111 | A1* | 4/2009 | Noda | H04N 21/23892 382/238 |

(Continued)

FOREIGN PATENT DOCUMENTS

CA    2831019    6/2013

OTHER PUBLICATIONS

World Intellectual Property Office, International Search Report and Written Opinion, Dated Oct. 21, 2013, issued in PCT Application No. PCT/CA2013/000330.

(Continued)

*Primary Examiner* — Jay Patel
*Assistant Examiner* — Shadan E Haghani
(74) *Attorney, Agent, or Firm* — Ridout & Maybee LLP

(57) ABSTRACT

Methods are provided for reconstructing d-bit samples from coefficients, in an encoded video bit-stream, that had been encoded based on source samples having a bit-depth D, where D>d. A residual process, including inverse-quantization and inverse-transformation processes, is applied to the coefficients to compute (D+1)-bit residual samples. Then a prediction process, including (i) rounding and/or truncating intermediate samples and (ii) subsequently clipping intermediate samples, is applied to the residual samples to compute d-bit reconstructed samples.

6 Claims, 21 Drawing Sheets

(56) References Cited

U.S. PATENT DOCUMENTS

| | | | |
|---|---|---|---|
| 2011/0249738 A1* | 10/2011 | Suzuki | H04N 19/184 |
| | | | 375/240.12 |
| 2012/0177111 A1* | 7/2012 | Narroschke | H04N 19/117 |
| | | | 375/240.12 |
| 2012/0307889 A1 | 12/2012 | Kerofsky et al. | |
| 2013/0022120 A1 | 1/2013 | Gupte et al. | |
| 2013/0034158 A1* | 2/2013 | Kirchhoffer | H04N 19/159 |
| | | | 375/240.12 |
| 2013/0083841 A1 | 4/2013 | Shen et al. | |
| 2013/0114678 A1 | 5/2013 | Baylon et al. | |
| 2014/0140411 A1 | 5/2014 | Alshina et al. | |
| 2014/0140416 A1* | 5/2014 | Yamazaki | H04N 19/00066 |
| | | | 375/240.25 |
| 2014/0169483 A1* | 6/2014 | Kumar | H04N 19/80 |
| | | | 375/240.29 |
| 2014/0294068 A1* | 10/2014 | Andersson | H04N 19/00127 |
| | | | 375/240.02 |

OTHER PUBLICATIONS

U.S. Office Action, U.S. Appl. No. 13/858,835, Dated Feb. 23, 2016.

* cited by examiner

METHODS FOR RECONSTRUCTING AN ENCODED VIDEO AT A BIT-DEPTH LOWER THAN AT WHICH IT WAS ENCODED

FIELD OF TECHNOLOGY

The present application relates generally to video compression and more particularly to decoding videos encoded at a higher bit-depth using decoders designed for videos having a lower bit-depth.

BACKGROUND

The process of video compression typically begins with the acquisition of a raw video signal, say when light strikes electronic components of a charge-coupled device (CCD) in a video camera. Conceptually, the camera is obtaining colour-component data for each pixel-position in each picture in a sequence of pictures that makes up the video; the colour components will be values of red, green, and blue if the CCD is based on the classic RGB colour space, or possibly with the addition of a fourth colour component that represents yellow or white light. In practice, various shortcuts may be taken. The CCD may detect only one colour component at each pixel location and extrapolate the missing components based on values from neighbouring pixels. (For example, green values—the most important for human visual perception—may be obtained at 50% of the pixel locations, while red and blue values are each obtained at 25% of the pixel locations.)

Based on the raw video signal, a video encoder makes further changes to the data to create a source video. RGB values are converted to co-ordinates in a colour space that allows the nature of human visual perception to be exploited to achieve greater compression efficiency. The colour components may be luma (an approximation of luminance) samples or chroma (short for "chrominance") samples. In modern video standards, including High-Efficiency Video Coding (HEVC), the luma component is denoted Y, while the chroma components are denoted $C_r$ and $C_b$. Beyond this basic conversion, common to all profiles (i.e., sets of available features) of the standard, many different options can be invoked (even within one profile) to select alternative ways to balance two competing goals of video compression: fidelity of the video reconstructed by a video decoder on the one hand and compression efficiency on the other hand. The design decision to choose certain options will be influenced by usage considerations, such as storage size, transmission bandwidth and the computational resources to effectively exploit a particular option.

When invoking various options, the luma data is treated differently from the chroma data, but $C_r$ and $C_b$ data are treated equally. For example, luma data is not down-sampled, but chroma data—of both types—may optionally be down-sampled; in other words, luma samples correspond to pixels on a one-to-one basis, but a chroma ($C_r$ or $C_b$) sample might correspond to more than one pixel. Luma samples in a source video might be represented at one bit-depth while both $C_r$ samples and $C_b$ samples might be represented at another bit-depth; thus the HEVC standard provides two parameters, BitDepthY for luma (Y) and BitDepthC for chroma samples for both $C_r$ and $C_b$. It should be noted that the treatment of bit-depth can apply to other colour spaces, including those with additional colour components such as those based upon a supplementary yellow stimulus, or those that incorporate alpha channels. The bit-depth of any such supplementary components may be based on a pre-existing parameter, or be provided in a new parameter.

An encoder will compress a source video comprising samples (said to be in the pixel domain) by, amongst other things, (a) forming a prediction of a set of samples and computing the difference between the prediction and source video samples (b) applying a transform (such as an integer approximation of a discrete cosine transform (DCT)) to generate transformed coefficients (said to be in the transform domain) and (c) quantize those coefficients to generate quantized, transformed coefficients. The coefficients will typically have more bits than the samples from which they were encoded.

Older standards specify and many current devices implement codecs based solely on bit-depths of 8 for both luma and chroma samples, for both encoding and decoding. Increased display resolutions, processor speeds, transmission speeds, and consumers' expectations for ever higher viewing experiences on small have spurred the standardization of profiles, for example in HEVC, that support encoding/decoding of samples having 10-bit or even higher precision. However, devices with limited resources, such as mobile devices, may still have decoders designed to handle only coefficients encoded based on samples having bit-depth 8.

In general, a problem arises when coefficients encoded based on samples of bit-depth D (e.g., 10) are encountered by a decoder designed to handle only samples of bit-depth d, with d<D (e.g., d=8).

BRIEF DESCRIPTION OF THE DRAWINGS

Reference will now be made, by way of example, to the accompanying drawings, which show example embodiments of the present application, and in which:

FIGS. 4a through 7c each show a block diagram detailing an embodiment disclosed herein of a method of decoding coefficients, corresponding to sources samples having an original bit-depth D, as reconstructed samples having a lower bit-depth d;

FIGS. 4a through 5b, more specifically, each depict an embodiment in which a residual process, including inverse-quantization and inverse-transformation processes, computes (d+1)-bit residual samples.

FIG. 4a, in particular, depicts an embodiment in which an inverse-quantization process comprises applying to a quantization parameter, input to the inverse-quantization process, an offset based on bit-depth d, rather than bit-depth D;

FIG. 4b, in particular, depicts an embodiment in which an inverse-quantization process comprises an inverse-quantization operation configured for use in reconstructing d-bit samples;

FIG. 5b, in particular, depicts an embodiment in which an inverse-transformation process comprises (a) an inverse-transformation operation configured to produce (D+1)-bit intermediate samples, given the output of an inverse-quantization designed for use in reconstructing D-bit samples and (b) a rounding-and/or-truncating process that, given said (D+1)-bit intermediate samples, produces (d+1)-bit residual samples;

FIGS. 6a through 7c, in contrast to FIGS. 4a through 5b, each depict an embodiment in which (a) a residual process, including inverse-quantization and inverse-transformation processes, computes (D+1)-bit residual samples and (b) a subsequent prediction process includes rounding and/or truncating intermediate samples;

FIGS. 6a through 6c, more specifically, each depict an embodiment in which rounding and/or truncating is performed for both inter-prediction and intra-prediction modes.

FIG. 6a, in particular, depicts an embodiment in which a d-bit output of a prediction operation is padded to produce a D-bit prediction samples;

FIG. 6b, in particular, depicts an embodiment in which a d-bit intermediate samples are padded to produce a D-bit input to a prediction operation;

FIG. 6c, in particular, depicts an embodiment that combines aspects of FIGS. 6a and 6b by (a) padding d-bit intermediate samples to produce a D-bit input to an intra-prediction operation and (b) padding a d-bit output of an inter-prediction operation to produce a D-bit prediction samples;

FIG. 7c, in particular, depicts an embodiment in which rounding and/or truncating is performed, only for inter prediction, after both an in-loop filtering operation and a sample-adaptive offset;

DESCRIPTION OF EXAMPLE EMBODIMENTS

In one aspect, a method is disclosed for reconstructing d-bit samples from coefficients, in an encoded video bit-stream, that had been encoded based on source samples having a bit-depth D, where D>d. A residual process, including inverse-quantization and inverse-transformation processes, is applied to the coefficients to compute (D+1)-bit residual samples. Then a prediction process, including (i) rounding and/or truncating intermediate samples and (ii) clipping intermediate samples, is applied to the residual samples to compute d-bit reconstructed samples.

In another aspect, a computing device is disclosed. The device comprises one or more processors and a memory containing processor-executable instructions. The instructions, when executed by the one or more processors, cause the device to perform a method for reconstructing d-bit samples from coefficients, in an encoded video bit-stream, that had been encoded based on source samples having a bit-depth D, where D>d. In the method, a residual process, including inverse-quantization and inverse-transformation processes, is applied to the coefficients to compute (D+1)-bit residual samples. Then a prediction process, including (i) rounding and/or truncating intermediate samples and (ii) clipping intermediate samples, is applied to the residual samples to compute d-bit reconstructed samples.

In yet another aspect, a non-transitory, processor-readable storage medium is disclosed. The medium stores processor-executable instructions in a magnetic, optical, solid-state, or like format. When executed by a computing device, the instructions, when executed by the one or more processors, cause the device to perform a method for reconstructing d-bit samples from coefficients, in an encoded video bit-stream, that had been encoded based on source samples having a bit-depth D, where D>d. In the method, a residual process, including inverse-quantization and inverse-transformation processes, is applied to the coefficients to compute (D+1)-bit residual samples. Then a prediction process, including (i) rounding and/or truncating intermediate samples and (ii) clipping intermediate samples, is applied to the residual samples to compute d-bit reconstructed samples.

Throughout the drawings, when used next to a data line, bit-depths indicate the bit-depth of the data flow at that point. On the other hand, when used as subscripts on a notation for a component, the bit-depth indicates the bit-depth of the samples for which the component is designed; for inverse-quantization and inverse-transformation operations, the operation may accept an input and/or produce an output of bit-depth greater than the value of the subscript.

When appearing in the same figure, the bit-depth d is always taken to be less than the bit-depth D.

Figure 1A:
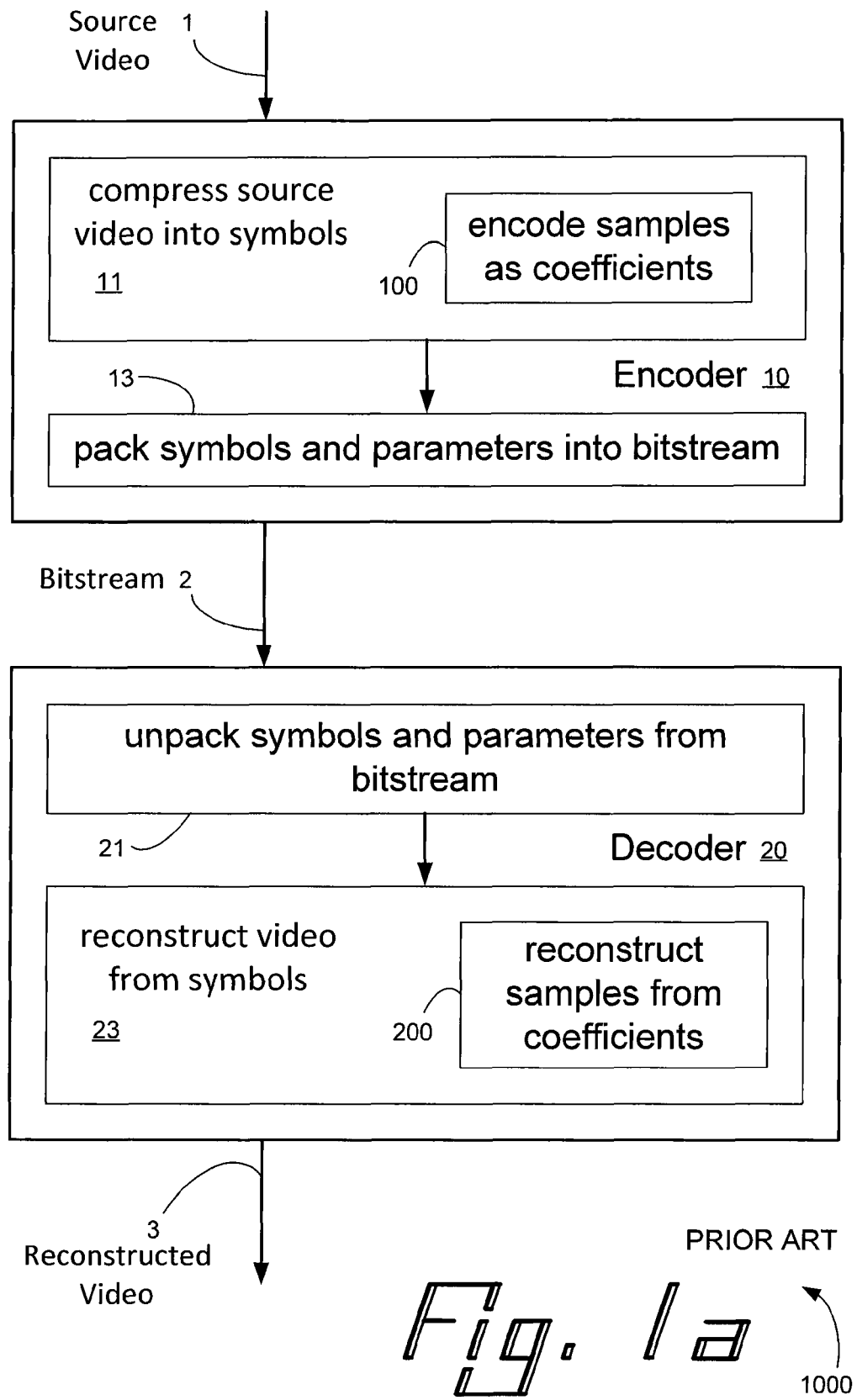
FIG. 1a shows a block diagram depicting a conventional sequence of (a) encoding a source video to generate a bit-stream and (b) decoding the bit-stream to generate a reconstruction of the video.

Referring first to FIG. 1, a block diagram is shown depicting a conventional sequence 1000 of encoding and decoding a video. Raw source video 1 is input to encoder 10. The encoding process generally comprises two major phases. First, in phase 11, the source video is compressed into symbols. This phase includes the encoding of source samples as coefficients at step 100. The sources samples may be luma (an approximation of luminance) samples or chroma (short for "chrominance") samples. Second, in phase 13, the symbols are binarized and packed into a bit-stream, together with parameters that indicate the particular way in which the compression took place. The parameters will be needed by a decoder, in order to correctly decode the bit-stream in a manner complementary to the way in which the source video was encoded. The skilled person appreciates that a wide variety of parameters specify, for example, what type of downsampling (if any) of pixels took place to obtain chroma source samples.

The result of the encoding process performed by encoder 10 on source video 1 is bit-stream 2, which expresses source video 1 in a compressed format.

Bit-stream 2 is processed by decoder 20, which is compatible with encoder 10 in that its decoding process is complementary to the encoding process of the encoder. This means that reconstructed video 3 produced by the decoder from bit-stream 2 is an acceptable facsimile of the source video, not a frame-by-frame, pixel-by-pixel duplicate. The extent to which reconstructed video 3 resembles source video 1 depends largely on the various parameters that determined how the compression took place. In particular, the parameters affect the compression ratio achieved by the encoding and the fidelity of the reconstructed video as a facsimile of the source video. In general, quality tends to suffer the more highly the video is compressed.

The decoding process generally comprises two major phases. First, in phase 21, symbols and parameters, as described above, are unpacked from bit-stream 2. Second, in phase 23, the video is reconstructed from the symbols, according to the parameters. For example, if the parameters indicate that downsampling of pixels took place to obtain chroma source samples, this downsampling must be reversed (since each sample corresponds to more than one pixel). The second phase includes reconstructing samples from coefficients at step 200.

The novel features disclosed herein are modifications to the conventional method of step 200, made to adapt a decoder, designed for video of lower bit-depth d, to handle a bit-stream produced by an encoder designed for video of higher bit-depth D. Throughout this disclosure, D and d are consistently used to represent a higher bit-depth and a lower bit-depth, respectively. For example, D may be 10 and d may be 8. However, the teachings of this disclosure are not limited to any specific values of D and d, as long as D>d.

Figure 1B:
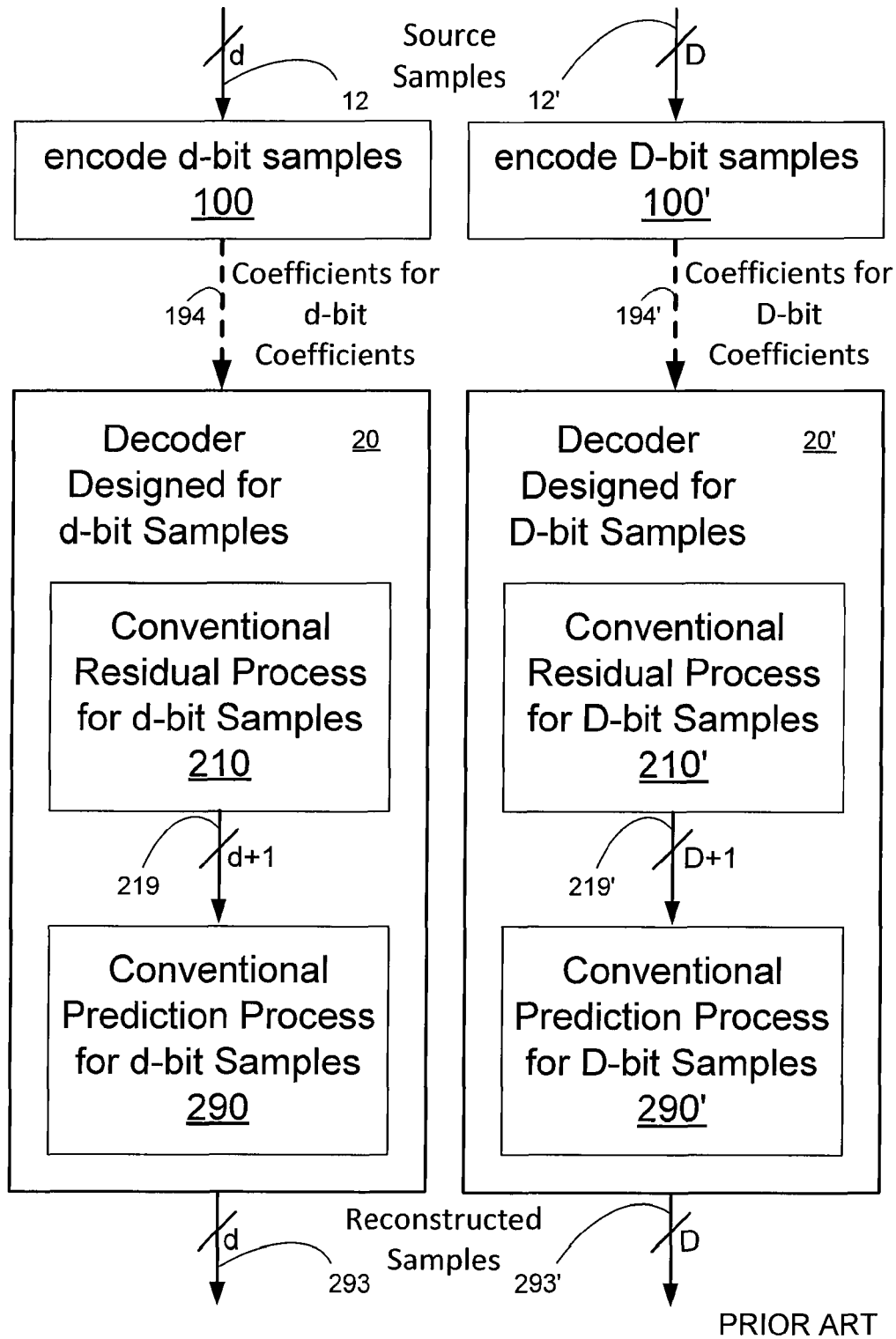
FIG. 1b compares two block diagrams depicting respective, conventional sequences, each for (a) encoding source samples having an original bit-depth (d or D) as corresponding coefficients and (b) decoding those coefficients as reconstructed samples having the same original bit-depth (d or D, respectively)

Turning now to FIG. 1b, two block diagrams are shown, side by side, depicting respective, conventional sequences, each for (a) encoding source samples having an original bit-depth as corresponding coefficients and (b) decoding those coefficients as reconstructed samples having the same original bit-depth. In the left sequence, d-bit source samples 12 are encoded at step 100, whereas in the right sequence, D-bit source samples 12' are encoded at step 100'; the two encoding procedures are designed to process their respective inputs and to output coefficients—194 for the left sequence and 194' for the right sequence—corresponding to the distinct bit-depths of the respective source samples.

In these two conventional sequences, coefficients of each type are processed by decoders designed for them. Decoder 20, designed for d-bit source samples, processes coefficients 194 in two major steps. Conventional residual process 210—for d-bit source samples—produces (d+1)-bit residual samples 219, which conventional prediction process 290—also for d-bit source samples—turns into d-bit reconstructed samples 293. Note that as meant herein, a reconstruction process or portion thereof is described as being "for d-bit samples" if it nominally performs as part of a sequence, such as steps 100 and 200, which is designed for d-bit samples 12 and d-bit reconstructed samples 293. During such an encoding-decoding sequence, intermediate results may have other bit-depths. For example, the residual samples 219, output by residual process 210 "for d-bit samples," each consist of d+1 bits; in particular, they each comprise a d-bit magnitude and a single sign bit. Usually in the accompanying figures, the number of data bits at a data flow is depicted next to a diagonal slash through the flow. In some cases, where they may vary, the bit-depth is not shown. This is the case with inputs and outputs of quantization and inverse-quantization operations (discussed later); nevertheless, these operations are still described as being "for d-bit samples" or "for D-bit samples" as the case may be, since there is a difference between operations for one bit-depth and those for the other bit-depth.

Continuing in reference to FIG. 1b, the right sequence is conceptually identical to the left sequence. The difference is that decoder 20' is designed to process coefficients 194' that correspond to D-bit—rather that d-bit—coefficients. Necessarily, conventional residual process 210'—for D-bit samples—produces (D+1)-bit residual samples 219', which conventional prediction process 290'—also for D-bit samples—turns into D-bit reconstructed samples 293'.

Figure 1C:
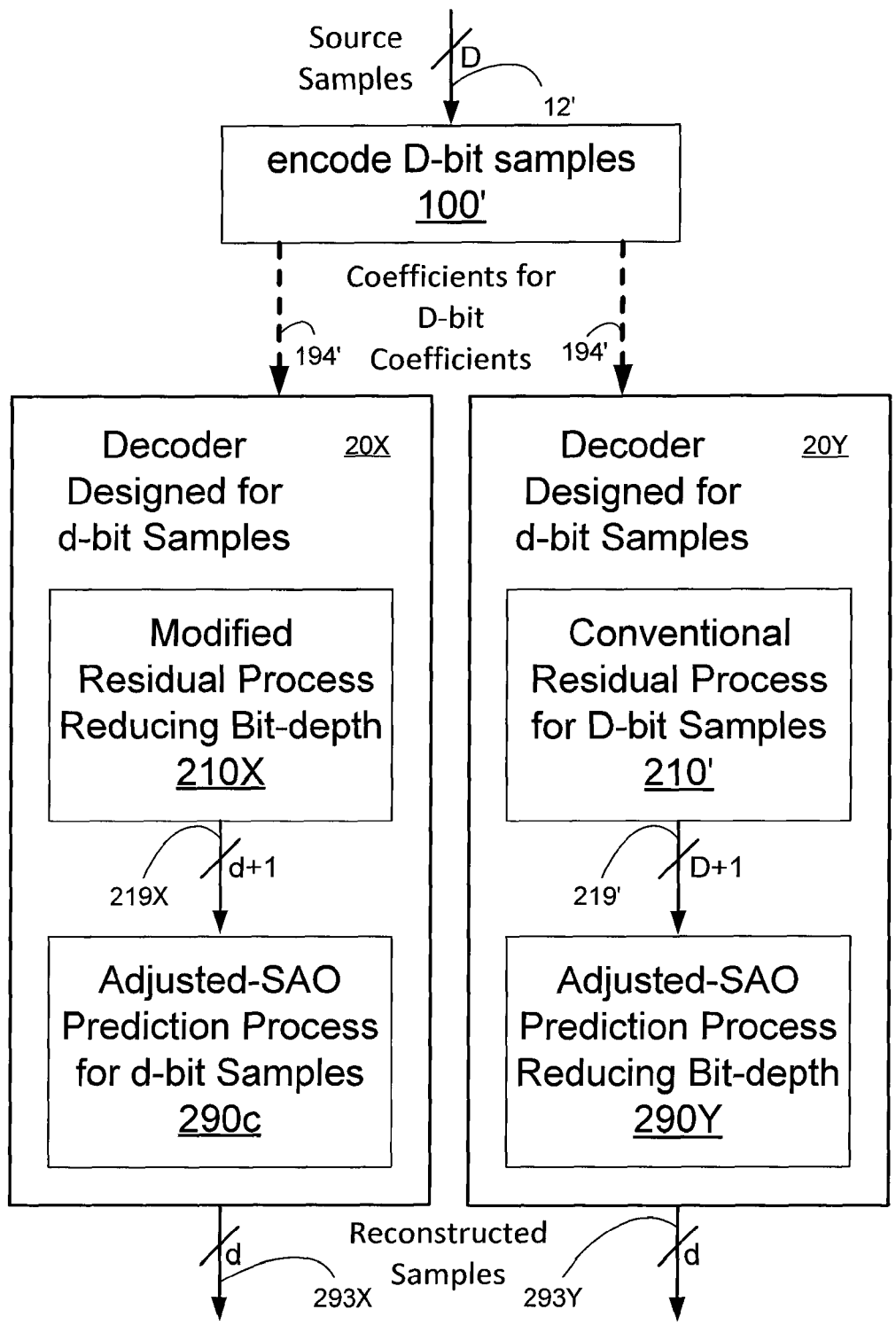
FIG. 1c shows a block diagram comparing two sequences, each for (a) encoding sources samples as coefficients having an original bit-depth D as corresponding coefficients and (b) decoding those coefficients as reconstructed samples having a lower bit-depth d than the original bit-depth D.

Now in reference to FIG. 1c, a block diagram is shown depicting, side by side, two sequences with a common starting point. Each sequence begins with the encoding of D-bit source samples at step 100' to produce coefficients 194' for D-bit samples. These coefficients are processed by two different types of novel decoders, each designed for d-bit samples; to reiterate, each decoder is designed primarily to process coefficients for d-bit samples. However, as disclosed herein, each is re-purposed to also handle coefficients for D-bit coefficients.

In the left sequence, decoder 20X features modified residual process 210X for d-bit samples, which reduces bit depth so that its output is (d+1)-bit residual samples 219X. Several ways of modifying conventional residual process 210 of FIG. 1b are described later in reference to FIGS. 4a through 5b, in which reference numerals 210c through 210g correspond to reference numeral 210X of FIG. 1c. Residual samples 219X, which will differ slightly depending on the particular embodiment of modified residual process 210X, are processed by prediction process 290c for d-bit samples, which is only modified so that a sample-adaptive offset (SAO)—an optional decoding step, to be described later—is adjusted for bit-depth d. This adjusted-SAO prediction process is the same for all embodiments of decoder 20X. The output of decoder 20X is d-bit reconstructed samples 293X for a reconstructed video that is a facsimile of source video 1. Necessarily, the reconstructed video has lower colour depth than the source video, though a human observer might not be aware that the reconstructed video having colour-depth d is less faithful to the source video than is a conventionally reconstructed video having colour-depth D, unless a side-by-side comparison is made. Ultimately, the various embodiments of decoder 20X produce slightly different outputs 293X due to the various versions of modified residual process 210X.

It should be noted that a D-bit decoder may be capable of decoding d-bit videos, where d<D, as faithfully as would be done by a d-bit decoder; in fact, an HEVC-compliant 10-bit decoder is required to be able to decode 9-bit and 8-bit videos as they were intended to be decoded. The problem dealt with in the present disclosure is the opposite situation: a d-bit-only decoder—i.e., a decoder than can only decode coefficients corresponding to sources samples having an original bit-depth of d—confronted with coefficients corresponding to sources samples having an original bit-depth of D, where D>d.

Figure 8A:
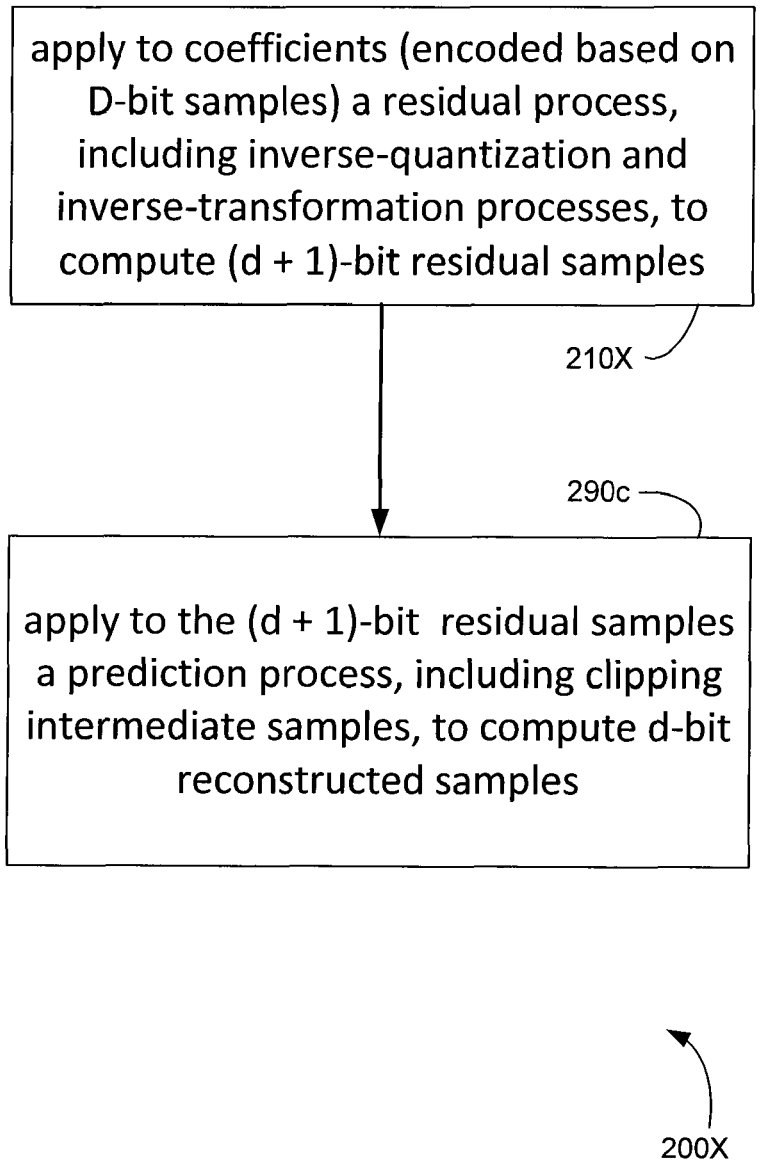
FIG. 8a, shows a flowchart depicting, at a high level, the methods depicted in block-diagram form in FIGS. 4a through 5b.

The method employed by decoder 20X is depicted in flowchart format in FIG. 8a.

In the right sequence, decoder 20Y features conventional residual process 210' for D-bit samples, whose output is (D+1)-bit residual samples 219' (exactly as in the right sequence of FIG. 1b). Residual samples 219' are processed by modified prediction process 290Y, which not only adjusts SAO if necessary, but, more importantly, reduces the bit depth to d. Several ways of modifying conventional prediction process 290' of FIG. 1b are described later in reference to FIGS. 6a through 7c, in which reference numerals 290h through 290l correspond to reference numeral 290Y of FIG. 1c. The output of decoder 20Y is also d-bit reconstructed samples 293Y for a reconstructed video that is a facsimile of source video 1; as with decoder 20X, the output will vary according to which version of adjusted-SAO prediction process 290Y is employed.

Figure 8B:
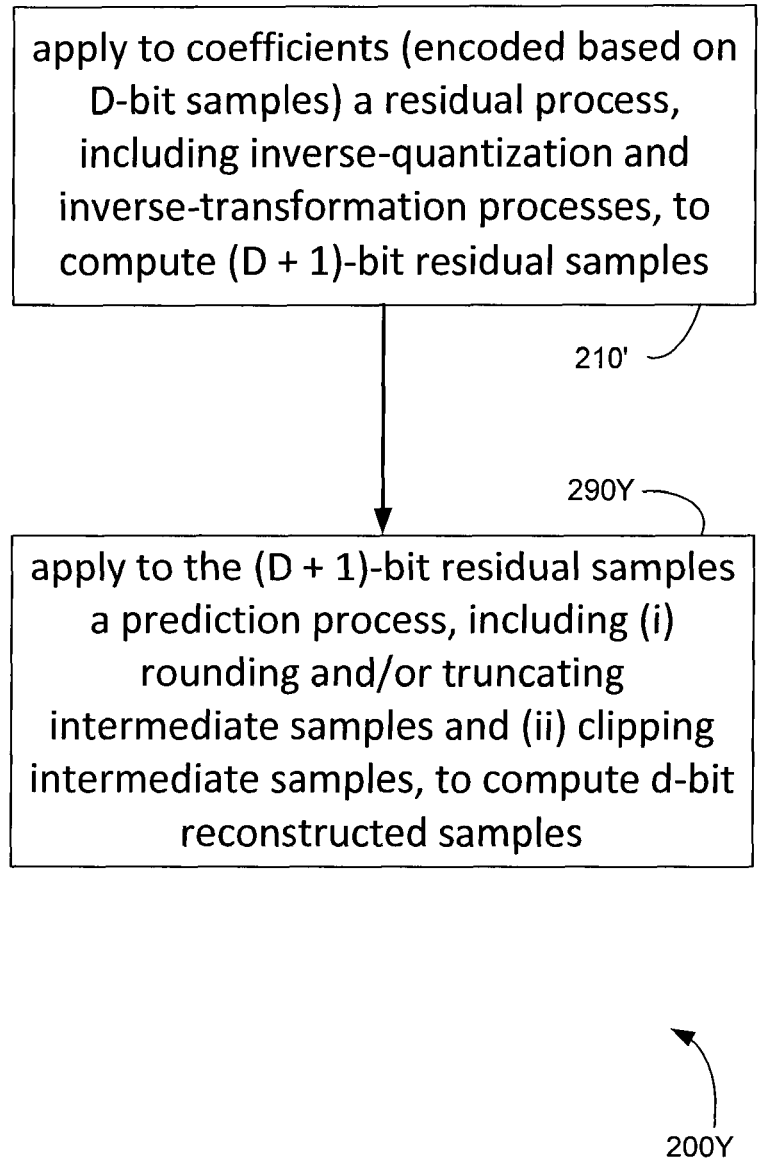
FIG. 8b, shows a flowchart depicting, at a high level, the methods depicted in block-diagram form in FIGS. 6a through 7c; and similar reference numerals may have been used in different figures to denote similar components.

The method employed by decoder 20Y is depicted in flowchart format in FIG. 8b.

Figure 2A:
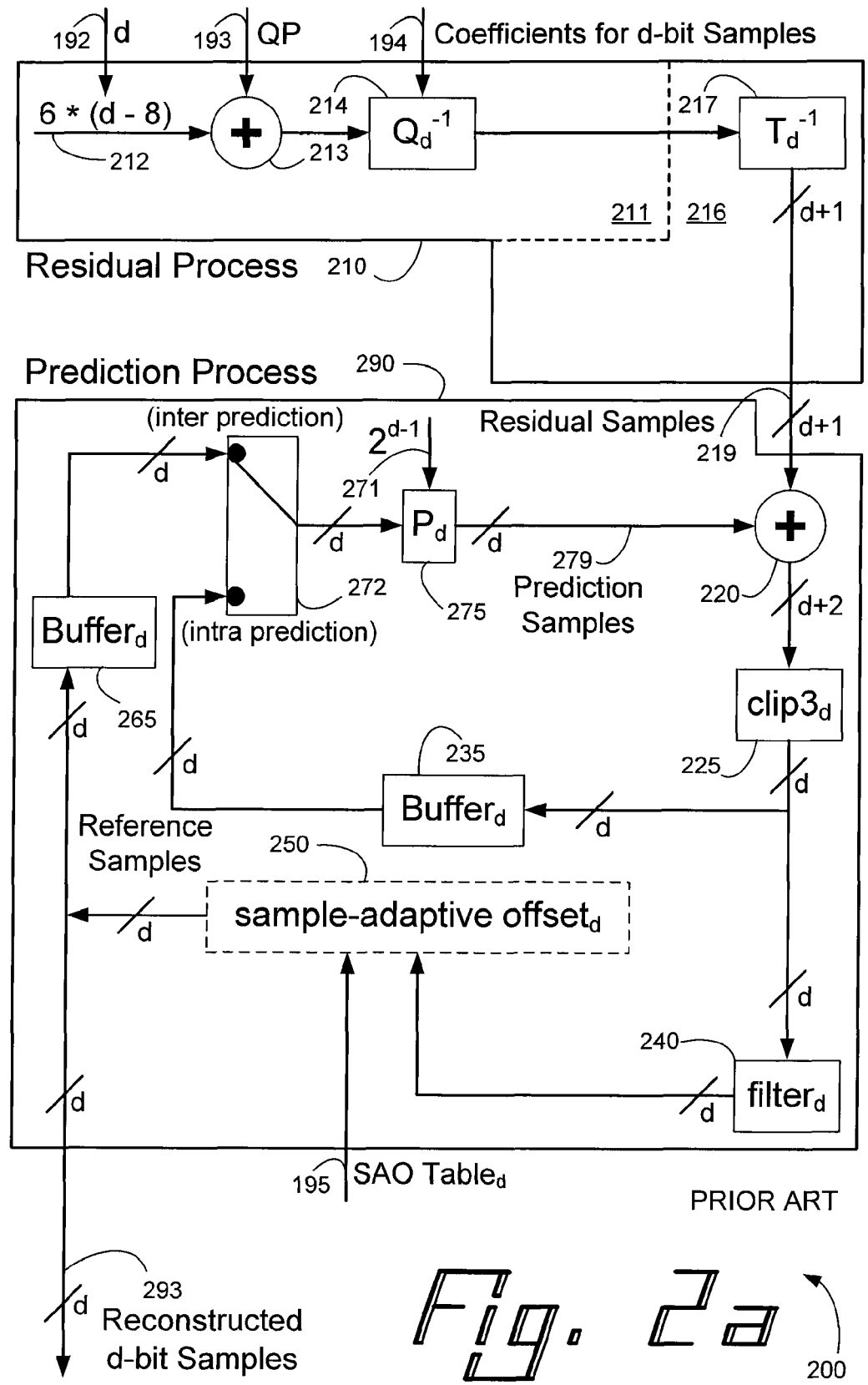
FIGS. 2a and 2b each show a block diagram depicting a conventional method of decoding coefficients, corresponding to sources samples having an original bit-depth (d in the case of FIG. 2a and D in the case of FIG. 2b), as reconstructed samples having the same original bit-depth (d and D, respectively)
Figure 2B:
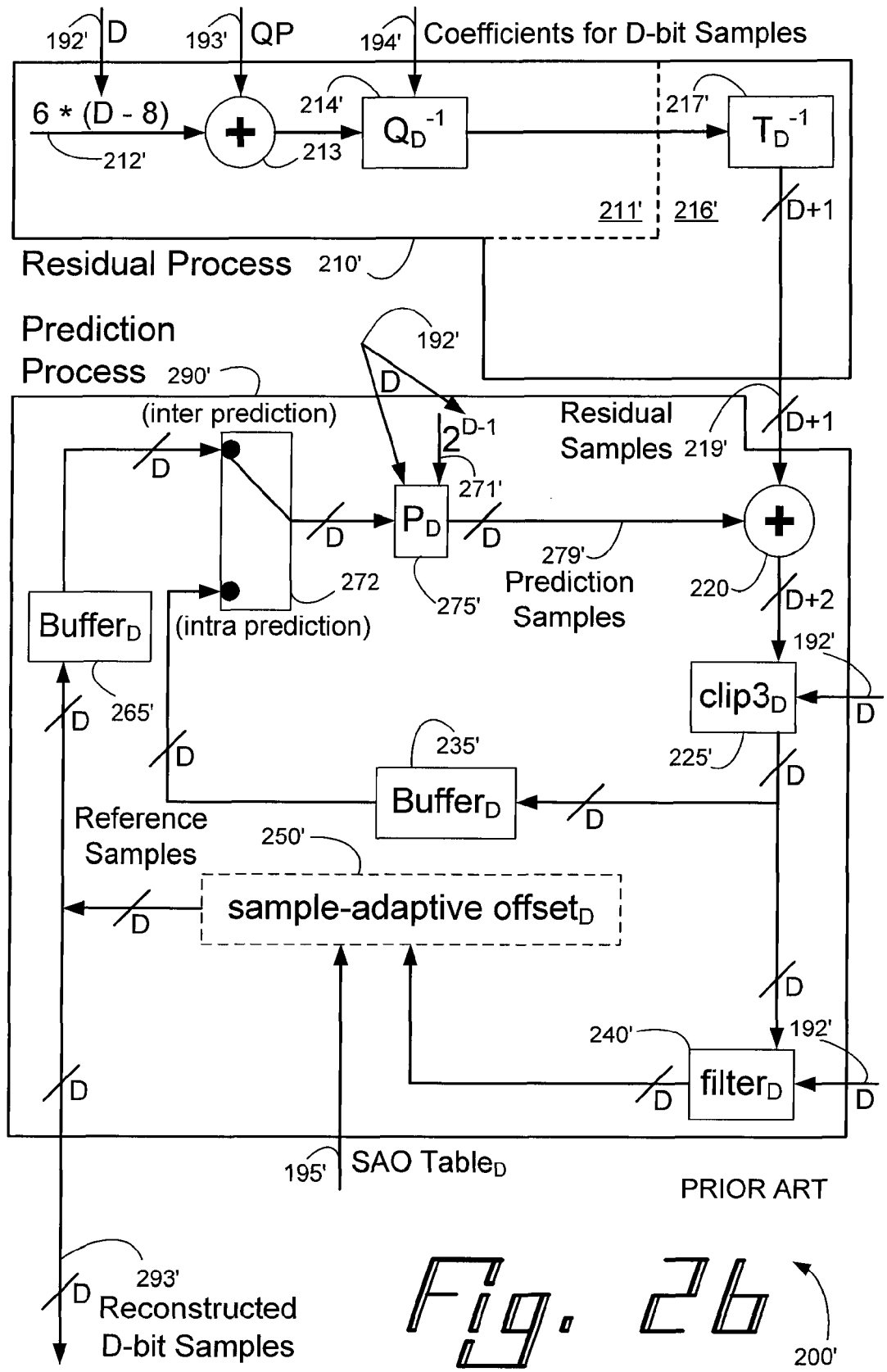

The inner workings of decoders 20 and 20' of FIG. 1b are detailed in FIGS. 2a and 2b respectively; each of the novel decoding methods disclosed herein incorporate some features of each figure. Features of FIG. 2b have the same numerals as corresponding features of FIG. 2a, but with a prime sign appended. For efficiency of presentation, both figures will be discussed together, with feature numerals of FIG. 2b shown parenthetically after feature numerals for corresponding features of FIG. 2a.

FIG. 2a (2b) shows a block diagram depicting conventional method 200 (200') of decoding coefficients 194 (194'), corresponding to sources samples 12 (12') of FIG. 1b having an original bit-depth d (D), as reconstructed samples 293 (293') having the same original bit-depth d (D). Each method comprises two major portions. In FIG. 2a (2b), residual process 210 (210') produces (d+1)-bit ((D+1)-bit) residual samples 219 (219') as input to prediction process 290 (290'), which uses them to generate d-bit (D-bit) reconstructed samples 293 (293') as the output of method 200 (200').

In addition to the coefficients 194 (194') to be decoded, method 200 (200') takes as input (a) bit-depth value 192 (192') of the source samples 12 (12')—namely d (D)—and (b) quantization parameter (QP) 193 (193').

Residual process 210 (210') comprises two sequential parts. First is inverse-quantization process 211 (211'); this part undoes a quantization process that took place during encoding 100' (of FIG. 8). Second is inverse-transformation process 216 (216'); this part undoes a discrete cosine transform (DCT) that took place during encoding 100'. By the socks-and-shoes principle, inverse quantization precedes inverse-transformation during decoding because the quantization followed the DCT during encoding.

In conventional method 200 (200'), inverse-transformation process 216 (216') comprises inverse-transformation operation 217 (217').

Inverse-quantization process 211 (211') is more complex. Inverse-quantization operation 214 (214') takes as input both coefficients 194 (194') and a quantization parameter, which is the basis for a factor by which quantization operation will multiply the coefficients to generate dequantized coefficients (i.e., coefficients restored to their previous scale, though typically not identical in value with the original, pre-quantization coefficients). However, that quantization parameter is not always the same as QP 193. In the case of method 200', when typically the larger bit-depth D exceeds 8, offset 212' is computed as 6*(D-8), and this offset is added to QP 193 at addition operation 213'. In the specific case of D=10, addition operation 213 has the effect of adding 12 to QP 193. In the case of method 200, when the smaller bit-depth d is typically 8, the value of 6*(d-8) is 0, so addition operation 213 amounts to adding 0, i.e., it has no effect on QP 193. The skilled person recognizes that implementation details of steps 212 (212') and 213 may vary; in some embodiments, a test may be performed to avoid an unnecessary computation at step 212 when d=8. Regardless of how inverse-quantization process 211 (211') is performed, the dequantized coefficients it generates are passed to inverse-transformation operation 217 (217'), already mentioned.

Still in reference to FIG. 2a (2b), prediction process 290 (290') takes as input (d+1)-bit ((D+1)-bit) residual samples 219 (219') as input; each such sample comprises a d-bit (D-bit) magnitude and a single sign bit.

Prediction samples 279 (279') output by prediction operation 275 (275') are combined at addition operation 220 with d-bit (D-bit) prediction samples 279 (279') generated during either (a) an intra-coding loop including storing reference samples in d-bit (D-bit) line buffer 235 (235') or (b) an inter-prediction loop including storing reference samples in d-bit (D-bit) picture buffer 265 (265'). The skilled person will understand that the term "n-bit buffer" in the context of video decoding means a buffer comprising n-bit words, enough n-bit words to holds all the n-bit samples needed to be stored in one cycle of the reconstruction loop. Prior to data flowing to either buffer, it must be clipped from bit-depth d+2 (D+2) to bit depth d (D) at clip3 operation 225 (225'); since one bit of the input is a sign bit, the clipping operation will take signed input, but only output non-negative numbers. As the skilled person is aware, clip3 operation 225 (225') is not a universal function in the way that a cosine function or addition operation is; there are different versions for outputs of different desired bit-depths. For bit-depth n, the corresponding clip3_n(_) operation clips its input, say an intermediate binary integer x, to n bits by (a) outputting zero if the input x is negative and (b) otherwise by outputting the minimum of n and the largest possible n-bit binary integer, namely $2^n-1$. For example, for n=8, clipping operation 225 will reduce to 255 all inputs greater than 255, increase to 0 all negative numbers, and leave unchanged all inputs that are already in the range [0, 255].

There is a significant difference between the respective clip3 operations in methods 200 and 200'. Clip3 operation 225 of method 200, being for a d-bit-only method, is designed for a fixed output bit-depth of d; it does not need to be configured based on the video being decoded, as that every processed video is assumed to be d-bit. On the other hand, clip3 operation 225' of method 200', is for not only D-bit samples, but also for samples of lower bit-depth; this is because that method is modeled on an HEVC-compliant decoder. (Recall that a 10-bit HEVC-compliant decoder must be able to decode 9-bit and 8-bit videos.) Since clip3 operation 225' of method 200' has a variable bit-depth output, it must be configured at run-time—based on the particular video being decoded—for the appropriate output bit-depth. Thus, unlike clip3 operation 225 of method 200, clip3 operation 225' of method 200' also taps off of bit-depth value 192' to determine its ceiling.

Which prediction loop is active is determined by mode selector 272, which is influenced by a parameter (not shown) unpacked from the bit-stream, indicating whether the current frame being decoded was inter coded or intra coded during encoding 100 (100'). (In fact, intra prediction is also used for inter-coded frames.)

In inter-prediction mode, the reference samples must also undergo in-loop filtering (such as de-blocking to remove decoding artifacts) at filtering operation 240 (240'). Input to filtering operation 240 (240') is compared to one or more thresholds, each of which is designed for a particular bit-depth. Therefore, as with clip3 operation 225 (225') described above, filtering operation 240 (240') must be configured to filter appropriately for the input's bit-depth, namely d (≤D). Once again, in the d-bit-only method, the bit-depth is assumed to be d, so filtering operation 240 of method 200 does not need to learn the bit-depth, d, from bit-stream 2 and to configure itself accordingly; on the other hand, filtering operation 240' of method 200' must learn the bit-depth, D or less, from bit-stream 2 by tapping off of bit-depth value 192', to determine which version of the filtering operation should be employed.

Optionally, a sample-adaptive offset may be performed at step 250 if and only if bit-stream 2 has an indicator that this is to be done.

Regardless of whether the decoding of method 200 (200') is operating in inter-coding mode or intra-coding mode, reference samples that had been loaded into either line buffer 235 (235') (in intra-coding mode) or picture buffer 265 (265') (in inter-coding mode) at a preceding cycle are used by prediction operation 275 (275') at the current cycle. The skilled person realizes that diagrams such as FIGS. 2a and 2b are common short-hand in the art for two separate feedback processes; in particular, the functioning of prediction operation 275 (275') is necessarily different for the two different modes. Moreover, the positioning of mode selector 272 within overall prediction process 290 (290') is merely for pictorial completeness. Conceptually, mode selection applies to the overall process, and how one loop or the other is selected is a matter of implementation choice. For example, in FIG. 6a, intra-prediction operation 275m and inter-prediction operation 275n are shown separately (in place of a single, place-holder prediction operation 275 (275')); this allows mode selector 272 to be depicted as following both prediction operators.

As with clip3 operation 225 (225') described above, prediction operation 275 (275') must be configured to produce prediction samples 279 (279') of the appropriate bit-depth, namely d (D). Also as with the clipping operation, in the d-bit-only method, the bit-depth is assumed to be d, so prediction operation 275 of method 200 does not need to learn the bit-depth, d, from bit-stream 2 and to configure itself accordingly; on the other hand, prediction operation 275' of method 200' needs to learn the bit-depth, D or less, from bit-stream 2 by tapping off of bit-depth value 192' to determine which version of the prediction operation should be employed.

If prediction operation 275 (275') requires a default input to take the place of missing data pre-determined d-bit (D-bit) input 271 (271') is provided to the prediction operation. This is conventionally a neutral value, such as $2^d-1$ ($2^D-1$) as shown in FIG. 2a (2b), which is termed "mid-grey" (after the resulting colour of a pixel whose luma and chroma samples are assigned this value). Given what has been said already about prediction operation 275 (275'), the default value is generated differently in methods 200 and 200'. In bit-d-only method 200, the default value is generated internally by decoder 20, with no need to learn the bit-depth from bit-stream 2; again, all processed videos are assumed to be d-bit. In variable-bit-depth method 200', the default value is generated by decoder 20' based on bit-depth value 192'.

The output of method 200 (200'), namely d-bit (D-bit) reconstructed samples 293 (293'), for the current cycle is identical to the reference samples stored in picture buffer 265 (265') for the next cycle.

FIGS. 2a and 2b depict nominal situations, in which a decoder is designed to handle videos of the type received in an efficient manner, in that sources samples and intermediate samples can be processed without wasted memory (due to D−d "overage" bits being stored in a second d-bit word) or wasted time and power (due to packing and unpacking to avoid wasted memory). FIGS. 3a through 7c, on the other hand, depict decoders that are designed for the smaller bit-depth d, but receive a video of bit-depth D, where D>d, and provides some type of accommodation to that mismatch—the alternative is to fail to reconstruct a video at all. Each depiction reuses features of FIGS. 2a and/or 2b with unchanged feature numerals or with altered feature numerals, depending on whether the feature is unchanged or altered. Features that are changed by design are highlighted with bold lines and boldface text. Data values that that change as a consequence of design changes are not so highlighted. In particular, each modified decoding method, generically denoted 200Z, produces a slightly different reconstructed video, denoted generically 293Z and denoted specifically with a distinct lower-case letter to match that for the method's feature numeral.

Figure 2C:
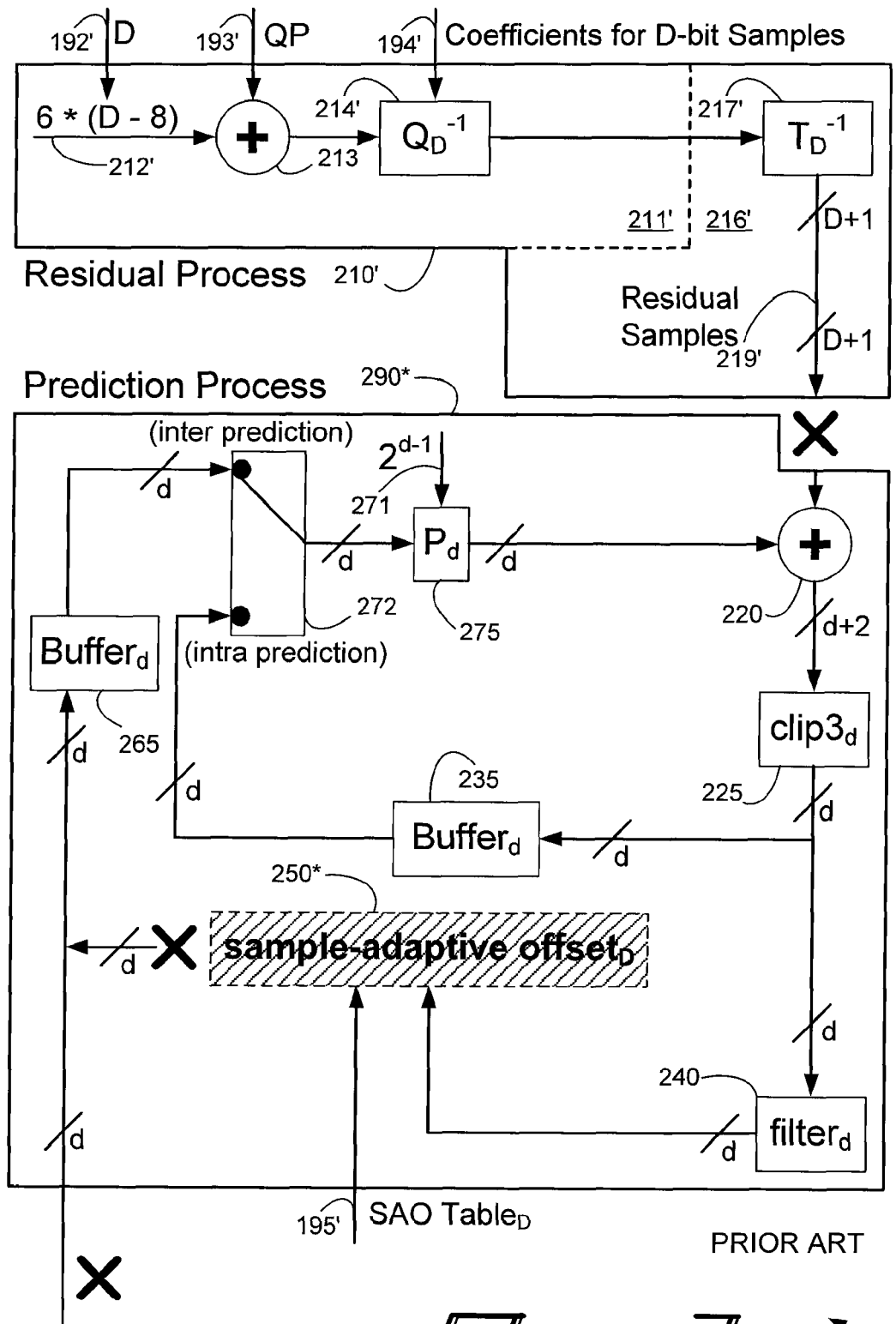
FIG. 2c shows a block diagram depicting the impediments to employing a d-bit decode to decode coefficients corresponding to sources samples having an original bit-depth of D.

FIG. 2c shows a block diagram depicting the impediments to employing a d-bit-only decoder to decode coefficients corresponding to sources samples having an original bit-depth of D, where D>d. More specifically, inoperable method 200\* represents what happens when known method 200' of FIG. 2b is confronted with coefficients for a D-bit video. FIG. 2c is a hybrid of FIGS. 2a and 2b, as will be explained presently.

In the first major portion of residual process 210' is shown as being identical to that in method 200' of FIG. 2b (rather than method 200 of FIG. 2a, as might seem logical for a d-bit decoder) because even 8-bit-only decoders already are capable of performing inverse-quantization and inverse-transformation operations 214' and 217', respectively, with bit-depth as high as 16 (double the native word-size of 8). This is because it is advantageous to preserve more bits of precision—in the transform domain—for the output of the DCT than for its input—in the pixel domain. (A cosine function applied to a non-zero integer input results in a non-terminating floating point output; the discrete cosine transform can be designed to produce any desired level of precision.)

Thus, the output of the first major portion of method 200\* is (D+1)-bit residual samples 219'. The first impediment comes from the fact that the second major portion, prediction process 290\* is designed for d-bit samples only. This is indicated by a large 'X' breaking the data from flowing from residual process 210' to prediction process 290\*.

However, prediction process 290\* is not depicted as being identical to prediction process 290 in method 200 of FIG. 2a.

This is because of optional SAO 250*. If bit-stream 2 contains an indication (not shown) that a sample-adaptive offset is to be applied to the output of filter 240 in the inter-prediction loop, the bit-stream will also contain SAO table 195'—which is input to SAO 250*—specifically designed for the bit-depth of the current video. (We will consider the case when that bit-depth is D, but it could be less than D; any bit-depth greater than d will be problematic.) In other words, regardless of the bit-depth for which the decoder is designed prior to its first decoding work, at the time of decoding any particular D-bit video, bit-stream 2 effectively causes SAO 250* to be configured so that is compatible with D-bit samples. Thus, in the hypothetical context of FIG. 2c (wherein d-bit data is flowing through prediction process 290*), SAO 250* cannot function correctly for videos of bit-depth greater than d. This is because SAO 250* is configured to use a lookup table that requires values to have a specific bit-depth to successfully perform as intended by the D-bit encoder that encoded the video. In reference to the HEVC standard, no output for SAO 250* is defined under these circumstances, wherein the SAO is configured for D-bit input, but is fed d-bit input. This is indicated by shading of inoperable SAO 250* and by a large 'X' breaking the data from flowing out of the SAO (as it would be spurious). This is a second impediment that must be solved, even if the first one is overcome, in the cases when bit-stream 2 indicates an SAO operation is to be performed.

The upshot of this is that there is no well-defined output of inoperable method 200*, as indicated by a large 'X' beside the hypothetical d-bit data line exiting prediction process 290*. The embodiments disclosed herein provide functioning solutions to the problems depicted in FIG. 2c. Each of the disclosed solutions (methods 200c through 200m, described in reference to FIGS. 4a through 7c) as well as one known solution (method 200b, described in reference to FIG. 3a) is depicted in reference to FIG. 2c; that is, features that have changed from FIG. 2c are shown with heavy lines and bold text.

Figure 3A:
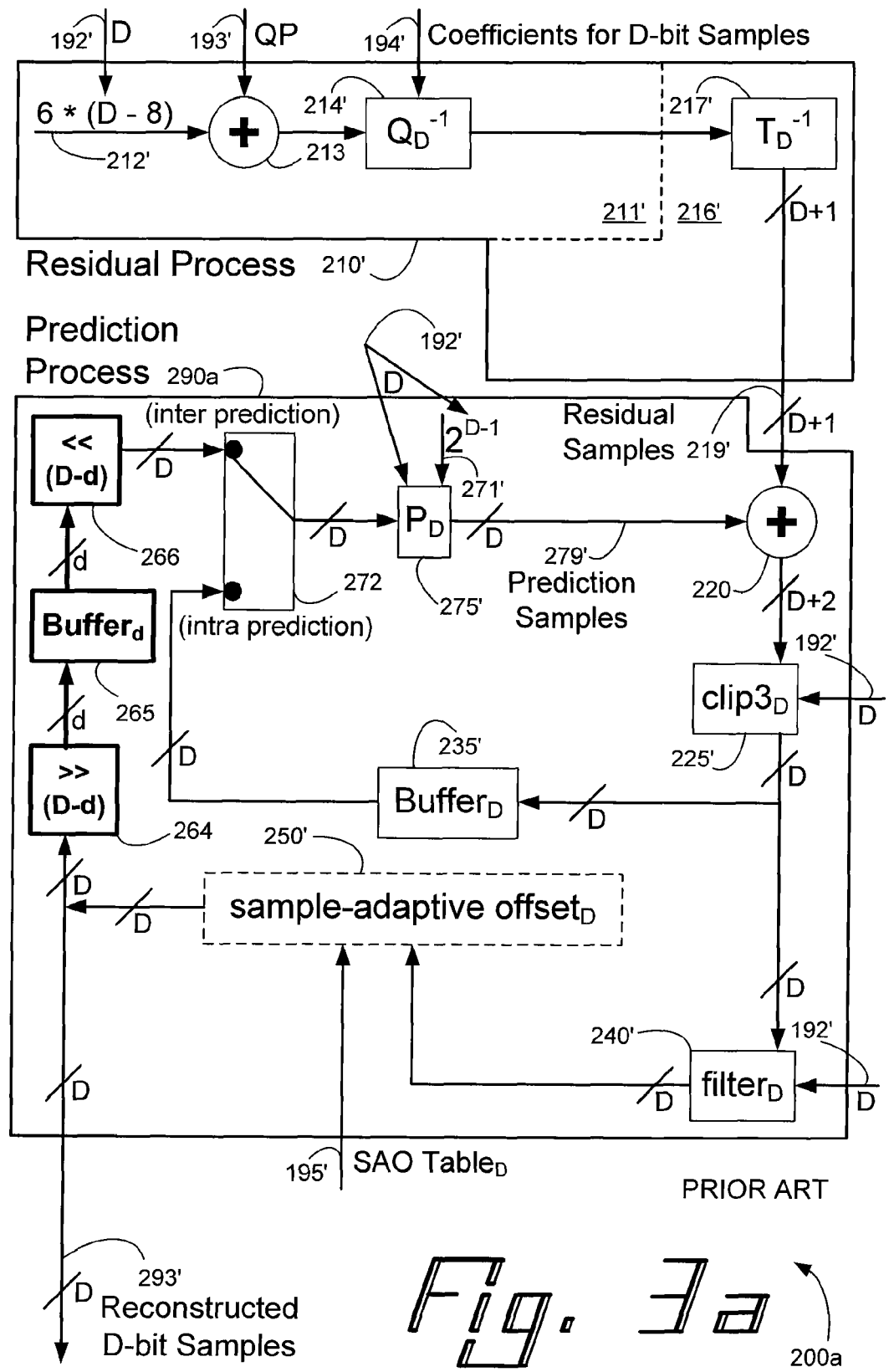
FIG. 3a shows a block diagram detailing a known method of decoding coefficients, corresponding to sources samples having an original bit-depth D, as reconstructed samples having the same original bit-depth D, while accommodating a picture buffer intended for reference samples of lower bit-depth d.
Figure 3B:
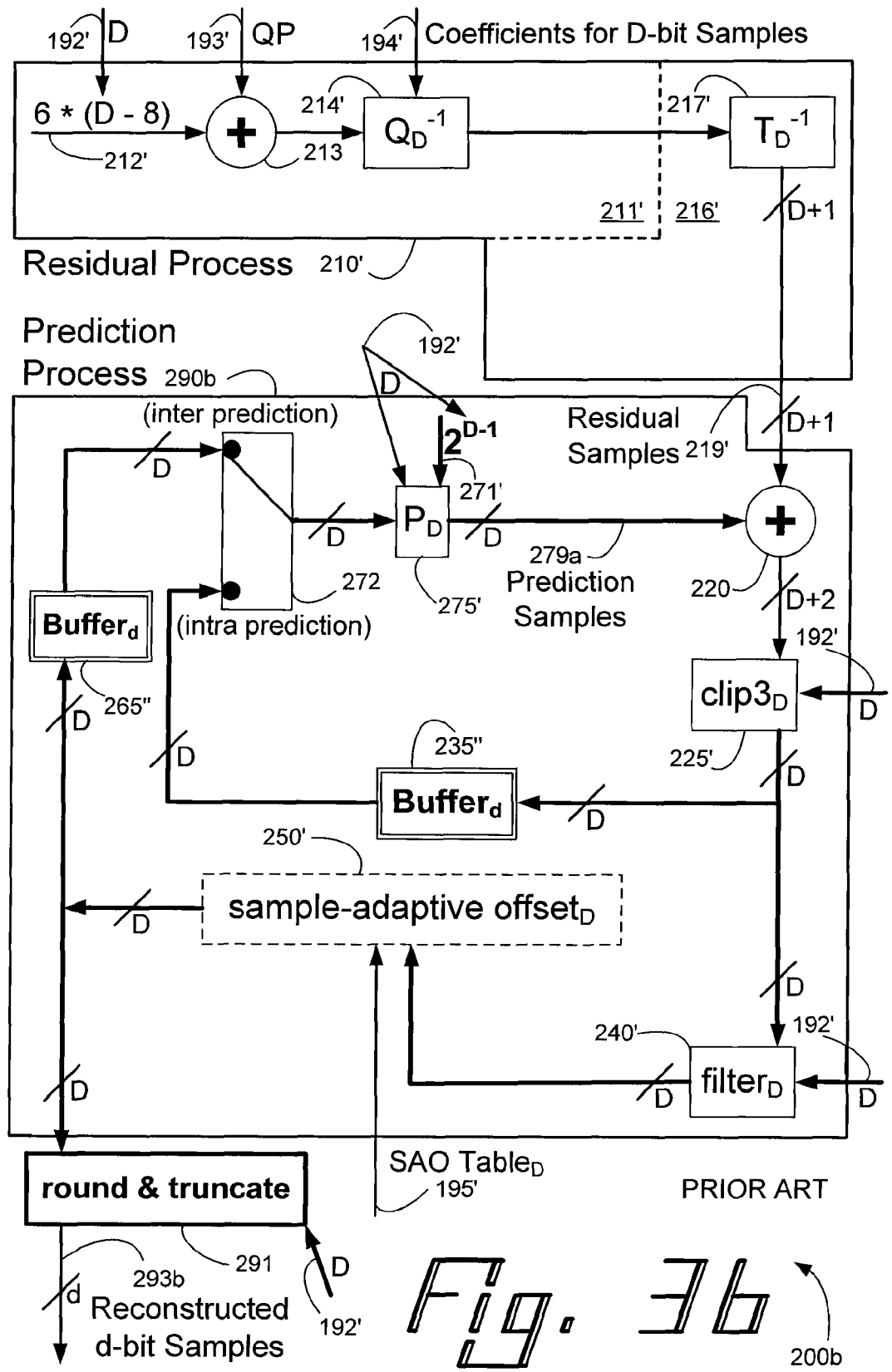
FIG. 3b shows a block diagram detailing a known method of decoding coefficients, corresponding to sources samples having an original bit-depth D as reconstructed samples having the lower bit-depth d, by (a) maintaining the same precision as in the conventional method of FIG. 2b throughout all computations and (b) rounding and/or truncating the resulting D-bit reconstructed samples to bit-depth d.

FIGS. 3a and 3b depict two known solutions, though they are not both directed to the problem of bit-depth overage.

FIG. 3a shows a block diagram detailing a known method 200a of using a D-bit decoder to decode coefficients 194', corresponding to sources samples 12' having an original bit-depth D, as reconstructed samples 293a having the same original bit-depth D; as such, this method does not solve the bit-depth overage problem addressed by the present disclosure. Its goal is merely ease the computation/storage burden posed by having to store one or more entire D-bit pictures at a time in picture buffer 265' in method 200' of FIG. 2b for inter-prediction. (Line buffer 235' is much smaller, so full-precision use of it does not incur as big a computation/storage penalty.) Instead, d-bit picture buffer 265, identical to that in FIG. 2a, is used in its place. This is made possible by added steps 264 and 266. Precision of the reference samples destined for it is reduced from D bits to d bits at step 264. A simple implementation is to shift each sample two bits right, effectively truncating the two least significant bits; this is mathematically equivalent to integer division by $2^{D-d}$ (in which remainders are lost). Picture buffer 265 can then handle each sample as it would for a d-bit video. So that prediction operation 275 will produce D-bit prediction samples 279' that combine appropriately with (D+1)-bit residual samples 219', precision of the reference samples destined for the prediction operation is increased from d bits to D bits at step 266, after the reference samples are moved from picture buffer 265. A simple implementation is to shift each sample two bits left, effectively padding the sample with two new least-significant bits, each equal to zero; this is mathematically equivalent to multiplication by $2^{D-d}$. The net result of the precision decrease before and the precision increase after storage in picture buffer 265 is equivalent to a preservation of precision, but loss of accuracy: The two least-significant bits of D bits are cleared (i.e., set to zero), so that each sample is effectively rounded down to the nearest multiple of $2^{D-d}$. Consequently, D-bit source videos reconstructed as D-bit videos according to method 200a will suffer in visual fidelity compared to those produced by a true D-bit decoder according to method 200' of FIG. 2b.

FIG. 3b shows a block diagram detailing known method 200b of decoding coefficients 194', corresponding to sources samples having an original bit-depth D as reconstructed samples having the lower bit-depth d, by (a) maintaining the same precision as in the conventional method of FIG. 2b throughout all computations in prediction process 290b—depicted by heavy data-flow lines—and (b) rounding and/or truncating the resulting D-bit reconstructed samples to bit-depth d at step 291; input of bit-depth value 192', which has the value D, is needed in order to determine by how many bits (D–d) the bit-depth must be reduced. To maintain precision, (larger) picture buffer 265" and (smaller) line buffer 235" must now be "doubled up" by some means (depicted by doubled outlines), generally by using more memory; for 8-bit decoders based on 8-bit words (and no compact packing and unpacking of samples), each buffering step for a 10-bit video will take twice the storage as for an 8-bit video.

The skilled person is aware of certain practicalities in respect of rounding-and/or-truncation operations mentioned in reference to FIG. 3b or to any figure depicting a novel embodiment disclosed herein. First, a rounding-and/or-truncation operation comprises one or both of rounding and truncating. Second, when both are employed, is advantageous to have the rounding operation followed by a truncation operation, rather than vice versa, for generating a more accurate prediction. Third, truncating can be implemented via a right-shift operation. Fourth, rounding can be one of many different types, including: (a) rounding toward zero, (b) rounding toward negative infinity, (c) rounding toward positive infinity, (d) rounding half values toward zero, (e) rounding half values toward negative infinity, (f) rounding half values toward positive infinity, (g) rounding half values toward the nearest even value, (h) rounding half values toward the nearest odd value, (i) stochastic rounding, (j) spatial dithering, and (k) spatial dithering in combination with any one of (a) through (h). Fifth, of these enumerated types, type (f) is favoured by the HEVC standard.

Turning now to the novel embodiments disclosed herein, they will first be compared to conventional methods in respect of how optional SAO is handled.

In both of methods 200a and 200b of FIGS. 3a and 3b, respectively, if the bit-stream contains an indication that a sample-adaptive offset (SAO) is to be applied to D-bit intermediate samples for inter prediction, that SAO can be applied exactly as intended, without modification, as in method 200' of FIG. 2b. This is because the input to SAO 250' is configured, by the input of SAO table 195', for D-bit input and is fed D-bit, filtered, reference samples. As mentioned above, in inoperable method 200* of FIG. 2c, SAO 250* is likewise configured, by the input of SAO table 195', for D-bit input, but is fed d-bit input.

In the case of all novel embodiments disclosed herein except the last one (described later in reference to FIG. 7c), the corresponding input is, instead, d-bit, filtered, reference samples. SAO makes use of a predetermined lookup table designed for the specific bit depth of the video, regardless of what bit-depth the decoder prefers. Moreover, even a d-bit-only decoder must input the table from bit-stream 2. (Contrast this with a d-bit-only decoder's assumption that certain operations will necessarily be used in their d-bit incarnations.) For a D-bit video, the encoder assumes the decoder will be a d-bit decoder; thus, the SAO table stored in bit-stream 2 is designed based on the assumption that D-bit samples will be used by the decoder to index into the table. However, in the novel embodiments mentioned, d-bit samples input to SAO 250c will lack D−d bits of data needed to perform a lookup. Therefore, in those methods providing d-bit input to SAO 250c, the SAO must be configured for use with d-bit intermediate samples. Otherwise, its output (not defined in the HEVC standard under such circumstances) will do serious, irreparable harm to the fidelity of the reconstructed video.

This can be done in several ways, which are not depicted in the figures. One approach is to configure SAO 250c to rescale d-bit intermediate samples to bit-depth D and then use the rescaled samples to perform lookups in a table configured for use with D-bit intermediate samples; the rescaling can be done in any known fashion, such as by padding (as in step 266 of FIG. 2b). Another implementation is to configure SAO 250c to perform lookups in a replacement table, which is itself configured for use with d-bit intermediate samples. (For method 200l, described later in reference to FIG. 7c, SAO 250' is exactly as it is in conventional method 200' of FIG. 2b.)

In the case of all novel embodiments disclosed herein, bit-stream unpacking operation 21 must be conducted with reference to the bit-depth signalled in bit-stream 2 due to the entropy-coding method employed in the packing of certain categories of symbol, wherein the bit-depth value may control the binarization process that converts the symbol into a string of binary digits. For example, in the case of a unary code, the symbol 0 would be represented by the string "0", the symbol 1 as "10", the symbol 2 as "110", etc. However, if it is known that there are only three symbols in the alphabet, the terminating 0 in the representation of symbol 2 is redundant given a priori knowledge of the alphabet by the decoder. In such cases, a truncated unary code may be employed that represents symbol 2 as "11". In the case of HEVC, some parameters, in particular for SAO, are binarized in this manner, where the size of the alphabet for SAO offset values is determined by bit-depth value 192.

Details—other than regarding SAO—will now be described for novel decoders in reference to FIGS. 4a through 7c.

Method 200e and methods 200g through 200m all incorporate rounding-and/or-truncation operations and, as previously disclosed, the rounding method can be one of many types. Careful choice as to the particular rounding method is necessary, since, in the absence of a closed loop system that accounts for the effects of the exact rounding-and/or-truncation operation different rounding methods will introduce different types of error. For instance, the relatively straightforward method of rounding half values toward positive infinity is not only asymmetric for positive and negative numbers, but contains a systematic bias that, when influencing the reconstruction loop, will result in a gain greater than one. The preferred method of rounding in these methods is rounding half values toward the nearest even value, also known as bankers' rounding, which is unbiased for both positive and negative numbers, for sufficiently well distributed values; a value n can be rounded with respect to the least significant D−d bits replacing n with (n+1+((n>>(D−d)) & 1))>>n, where ">>" is the right-shift operator and "&" is the bit-wise AND operator.

FIG. 8a shows a flowchart depicting, at a high level, all of methods 200c through 200g, which are detailed in block-diagram format in FIGS. 4a through 5b, respectively. These five embodiments have in common that they each comprise a residual process 210X, including inverse-quantization and inverse-transformation processes, that computes (d+1)-bit residual samples. Each of the five embodiments will have a distinct residual process 210X, but a common prediction process 290c.

Figure 4A:
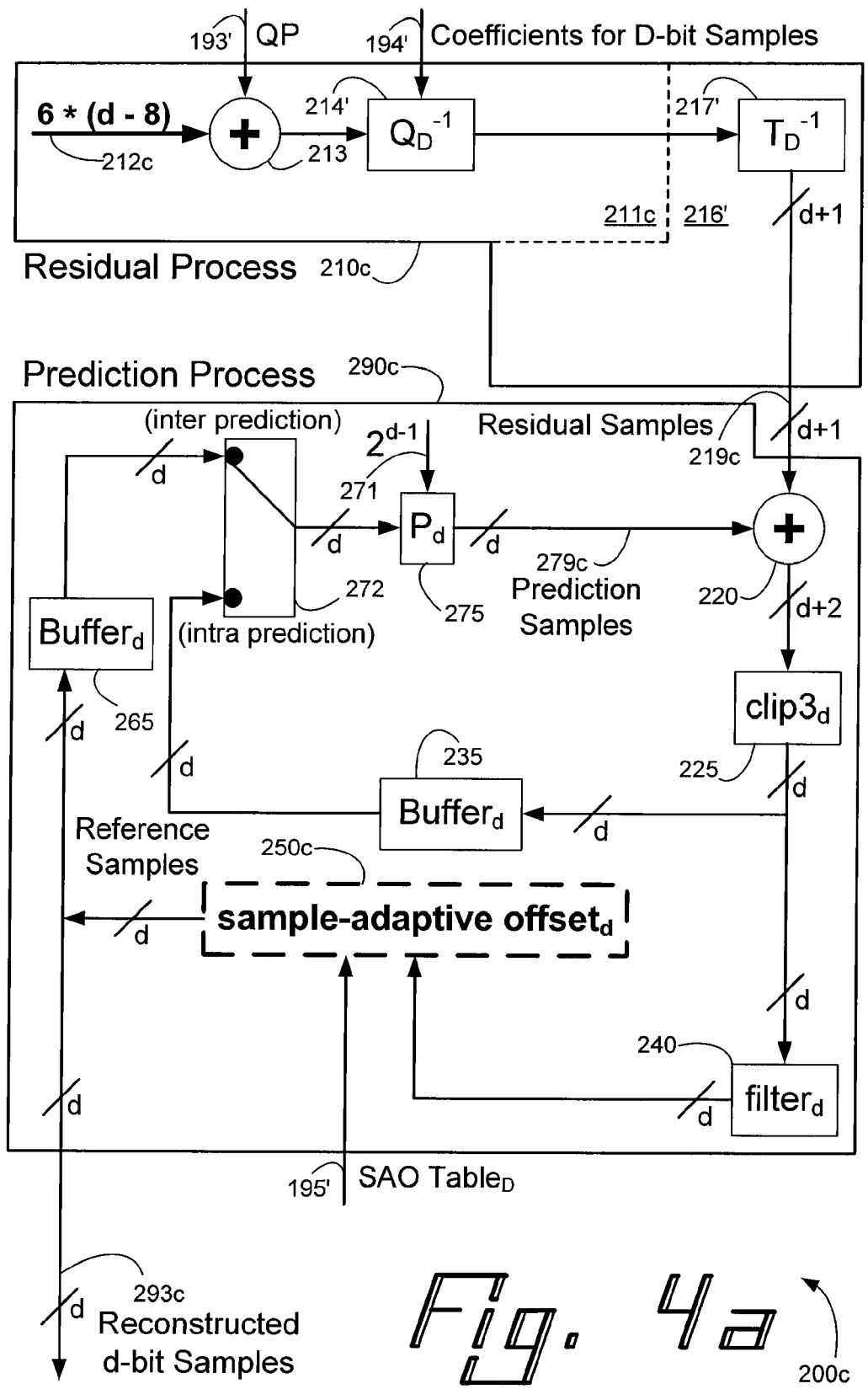
Figure 46:
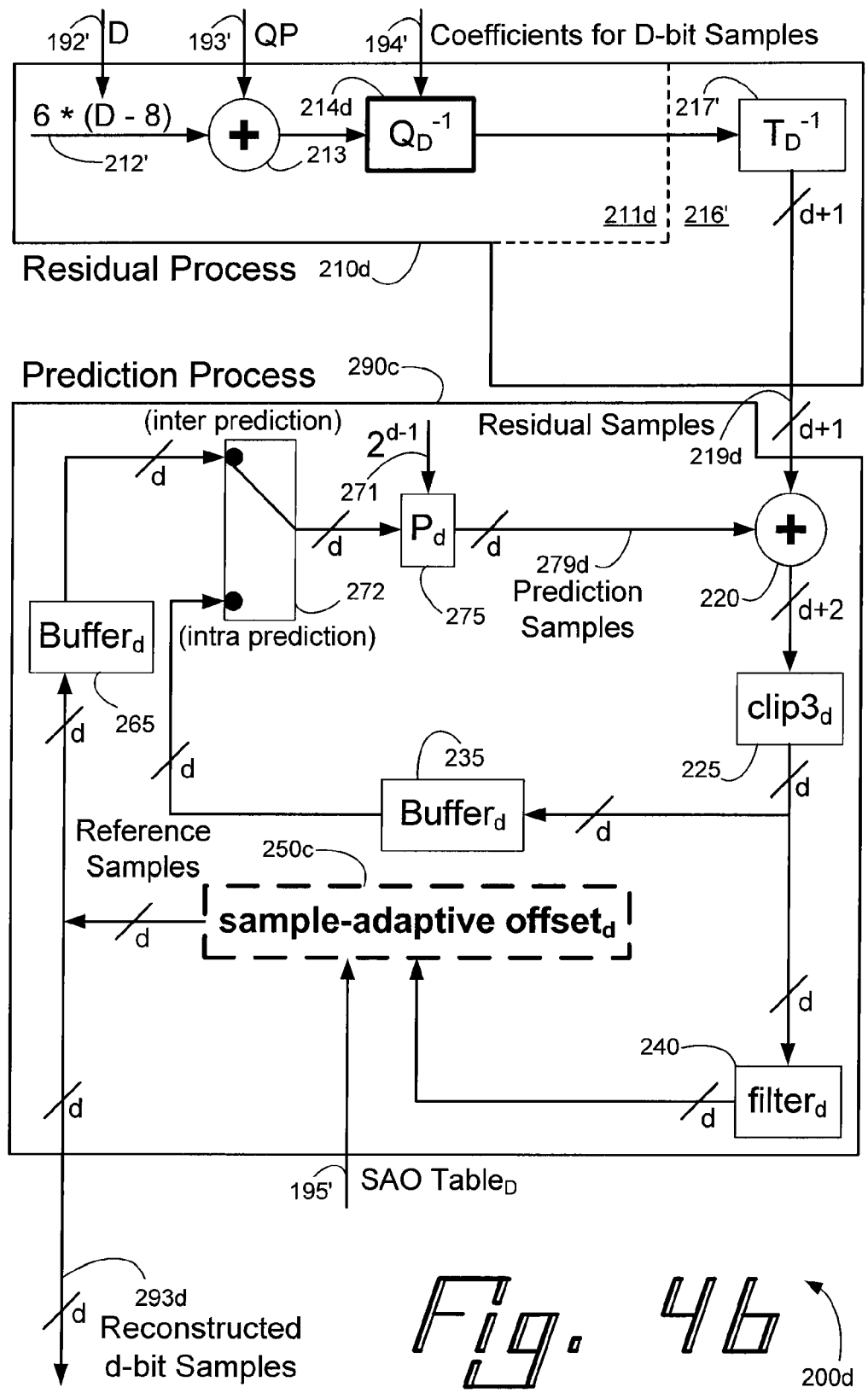
Figure 4C:
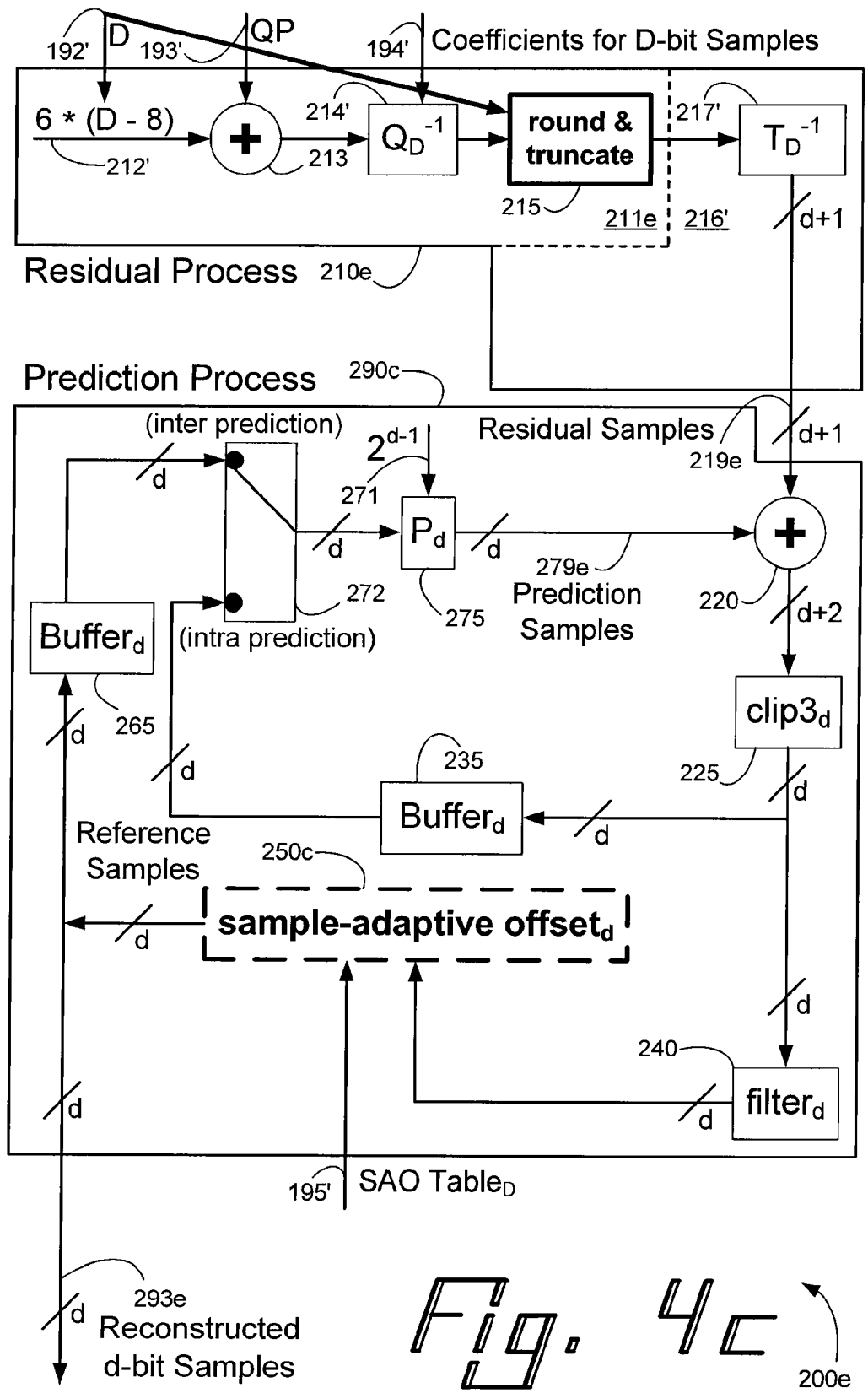
FIG. 4c, in particular, depicts an embodiment in which the inverse-quantization process comprises applying an inverse-quantization operation configured for use in reconstructing D-bit samples and rescaling intermediate samples output by the inverse-quantization operation.

More particularly, methods 200c through 200e of FIGS. 4a through 4c, respectively, have in common that they each depict an embodiment in which inverse-transformation process 216' comprises an inverse-transformation operation for use in reconstructing D-bit samples (exactly as FIG. 2b) and in which conventional inverse-quantization process 211' of method 200' is modified so that its output, when processed by conventional inverse-transformation operation 217', results in (d+1)-bit residual samples, rather than (D+1)-bit samples, as it does in the case of conventional method 200' of FIG. 2b. There are three different ways to modify conventional inverse-quantization process 211' of method 200', reflected in methods 200c, 200d, and 200e, which produce slightly different reconstructed d-bit samples 293c, 293d, and 293e, respectively.

As shown in FIG. 4a, the modification in inverse-quantization process 211c comprises is in applying an offset based on bit-depth d—rather than bit-depth D—to QP 193'. Rather than using input 192' to generate an offset of 6*(D−8) as at step 212' of FIG. 2c, that input is suppressed or ignored. Instead, the offset 6*(d−8) is generated locally (without regard to the bit-depth, D, indicated in bit-stream 2) at step 212c. By adding this smaller offset (which will equal zero when d=8) to the QP, rather than the larger 6*(d−8), at addition operation 213, subsequent inverse-quantization operation 214', which uses the offset QP from addition operation 213, produces dequantized samples such that conventional inverse-transformation operation 217' produces (d+1)-bit residual samples 219c.

Of the various methods disclosed herein, method 200c of FIG. 4a is the simplest to implement (since the minor change at step 212c merely ignores the value of the bit-depth of the source samples), but it is the least faithful in reconstructing videos. One reason is that no attempt is made to address the increased range of QP values that are potentially present in a bit-stream intended for D-bit decoders (To accommodate the greater fidelity of D-bit systems, the valid range of QP values increases with higher bit-depths), as such, it is only applicable in systems that do not use the extended QP range (this would be typical of bit-streams that target low bit-rate applications such as video streaming). Another reason is that the lower precision is used from the very beginning of the reconstruction process, whereas in the other disclosed methods, at least some computations are done with the higher precision. Specifically, 8-bit decodings of 10-bit source videos, performed according to method 200c, exhibit visually observable drift with the following traits. First, intra prediction suffers DC drift from block to subsequent block, which increases towards the bottom right. Second, this drift is more noticeable in colour and in saturation than in luminance. Third, inter prediction increases the drift from picture to subsequent picture. Fourth, the distortion introduced by the drift can exceed 11 dB in unfavourable conditions. Finally, the distortion is worse for smaller QP values.

As shown in FIG. 4b, the modification in inverse-quantization process 211d comprises modifying inverse-quantization operation 214d so that it produces inverse-quantized coefficients of the same magnitude as are produced by inverse-quantization operation 214 in FIG. 2a, despite using a QP offset exactly as in FIG. 2c. The dequantized samples produced by inverse-quantization operation 214d are such that conventional inverse-transformation operation 217' produces (d+1)-bit residual samples 219d.

As shown in FIG. 4c, the modification in inverse-quantization process 211e comprises adding a new step. QP-offsetting 212', 213 and inverse-quantization operation 214' are configured for use in reconstructing D-bit samples exactly as in FIG. 2c. In order to provide dequantized samples to conventional inverse-transformation operation 217' for it to produce, in turn, (d+1)-bit residual samples 219e, the intermediate samples output by inverse-quantization operation 214' are rescaled at step 215. As shown in FIG. 4c, this may be done by a rounding-and/or-truncating operation. In practice, rescaling step 215 will reduce the magnitude of intermediate samples (flowing from inverse-quantization operation 214' and inverse-transformation process 217) by D−d bits (even though the bit-depth of samples at this stage is greater than D); input of bit-depth value 192', which has the value D, is needed in order to determine by how many bits the bit-depth must be reduced.

Figure 5A:
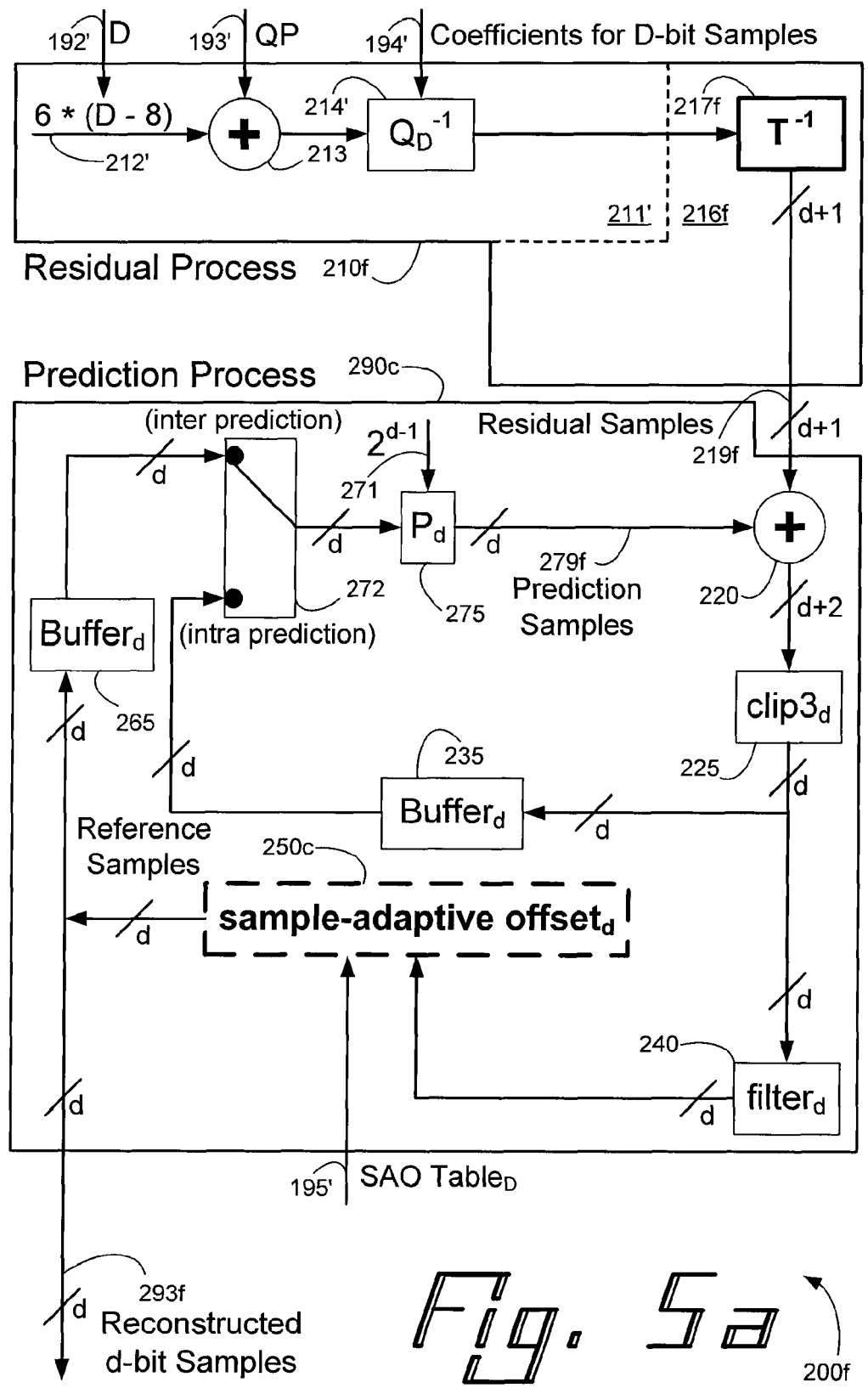
FIG. 5a, in particular, depicts an embodiment in which an inverse-transformation process comprises an inverse-transformation operation configured to produce (d+1)-bit intermediate samples, given the output of an inverse-quantization designed for use in reconstructing D-bit samples.
Figure 5B:
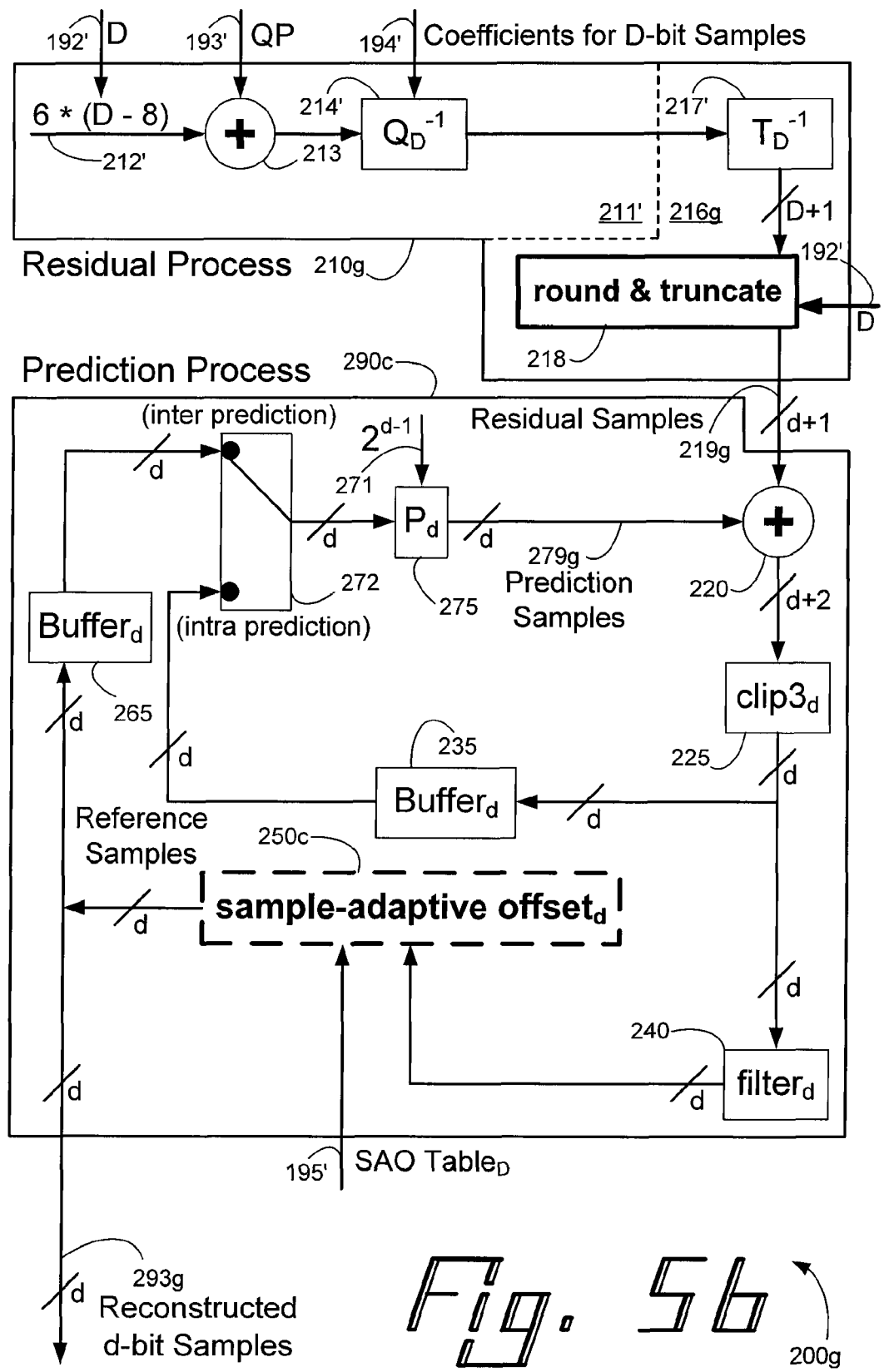

On the other hand, methods 200f and 200g of FIGS. 5a through 5b, respectively, have in common that they each depict an embodiment in which entire inverse-quantization process 211' is exactly as in FIG. 2c and inverse-transformation process 216' of FIG. 2c is modified. In particular, inverse-quantization process 211' comprises inverse-quantization operation 214' for use in reconstructing D-bit samples. Conventional inverse-transformation process 216' of method 200' is modified so as to produce (d+1)-bit residual samples, given the output of conventional inverse-quantization process 211'. There are two ways to modify conventional inverse-transformation process 216' of FIG. 2c, reflected in methods 200f and 200g, which produce slightly different reconstructed d-bit samples 293f and 293g, respectively.

As shown in FIG. 5a, the modification in inverse-transformation process 216f comprises replacing conventional inverse-transformation operation 217' of FIG. 2c with inverse-transformation operation 217f, which is configured to produce (d+1)-bit residual samples 219f, given the output of conventional inverse-quantization process 211'.

As shown in FIG. 5b, the modification in inverse-transformation process 216f comprises (a) retaining conventional inverse-transformation operation 217' configured, exactly as in FIG. 2c, to produce (D+1)-bit intermediate samples, given the output of conventional inverse-quantization process 211' and (b) adding subsequent rounding-and/or-truncating process 218 that, given said (D+1)-bit intermediate samples, produces (d+1)-bit residual samples 219g; input of bit-depth value 192', which has the value D, is needed in order to determine by how many bits (D−d) the bit-depth must be reduced.

FIG. 8b shows a flowchart depicting, at a high level, all of methods 200h through 200m, which are detailed in block-diagram format in FIGS. 6a through 7c, respectively. These six embodiments have in common that they each comprise residual process 210', including inverse-quantization process 211' and inverse-transformation process 216', computes (D+1)-bit residual samples 219', exactly as in FIG. 2c. In each of the these methods, conventional prediction process 290' of FIG. 2c is modified to include a rounding-and/or-truncating operation (in addition to conventional clip3 operation 225 or 225'), which reduces a (D+h)-bit input to a (d+h)-bit output, where h equals 2 if the rounding-and/or-truncating operation occurs before clip3 operation 225 (as in FIGS. 6a through 6c) and equals 0 if the rounding-and/or-truncating operation occurs after clip3 operation 225' (as in FIGS. 7a through 7c). All six of these embodiments will have a distinct prediction process 290Y.

Figure 6A:
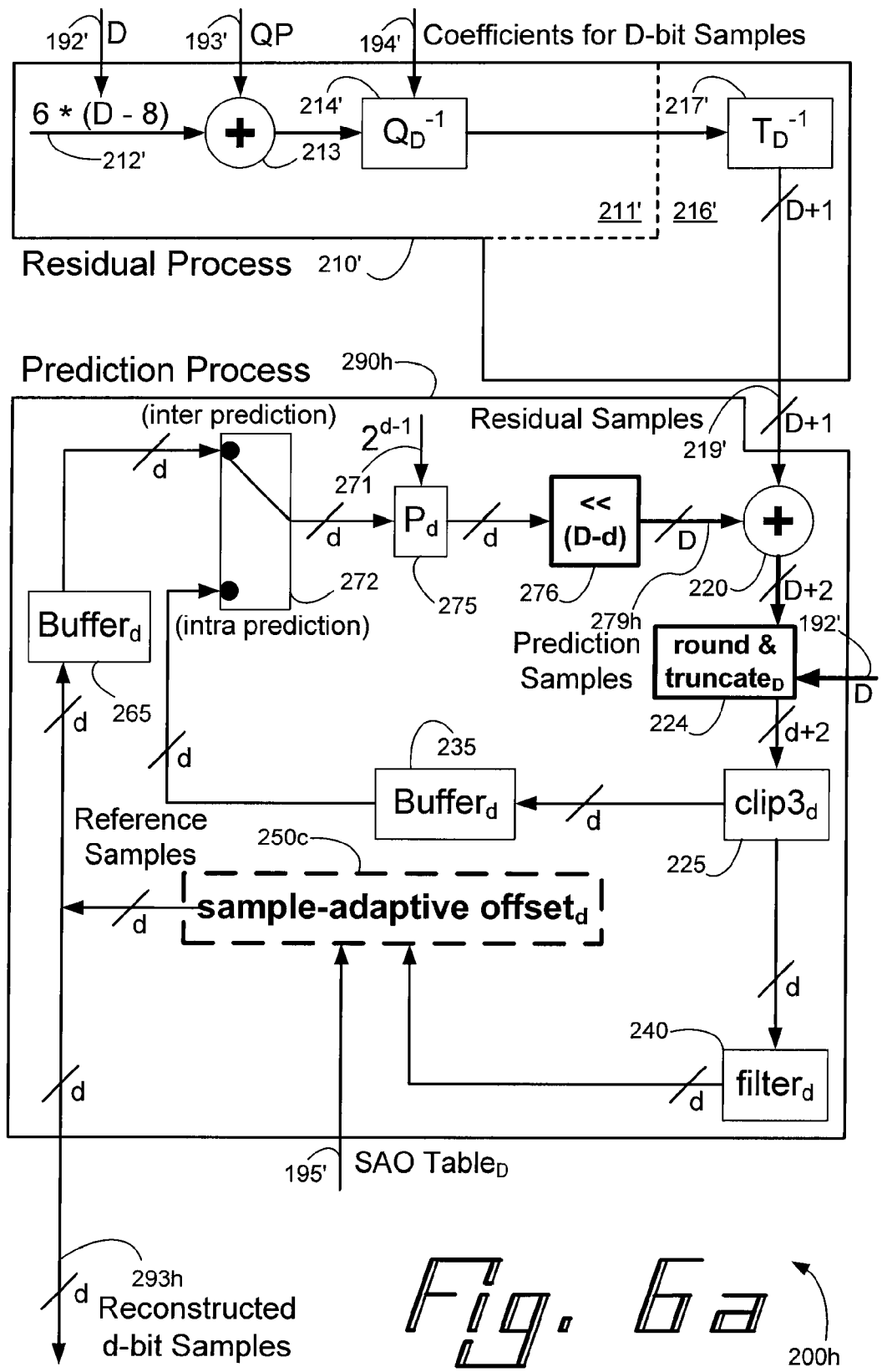
Figure 6B:
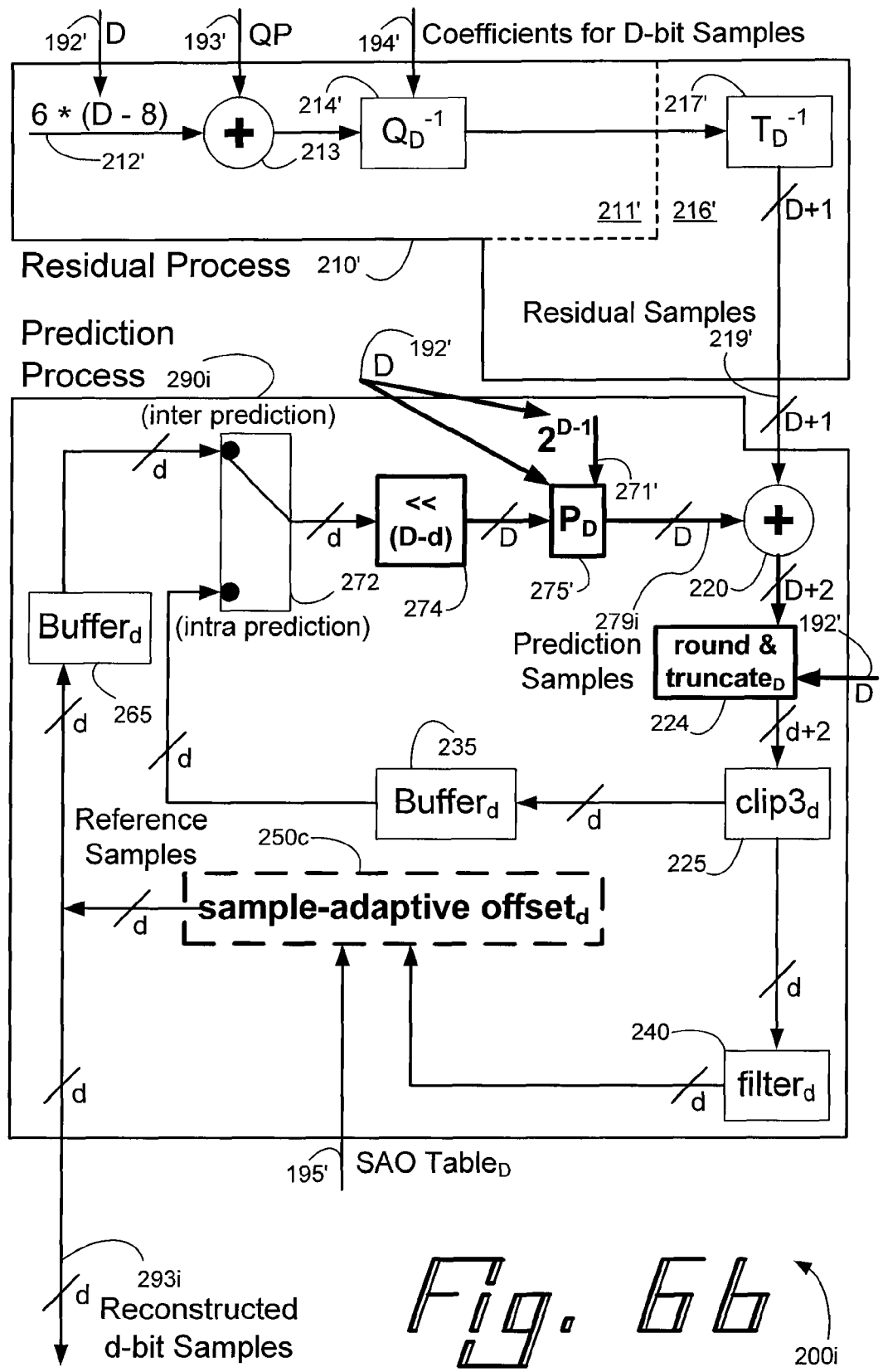
Figure 6C:
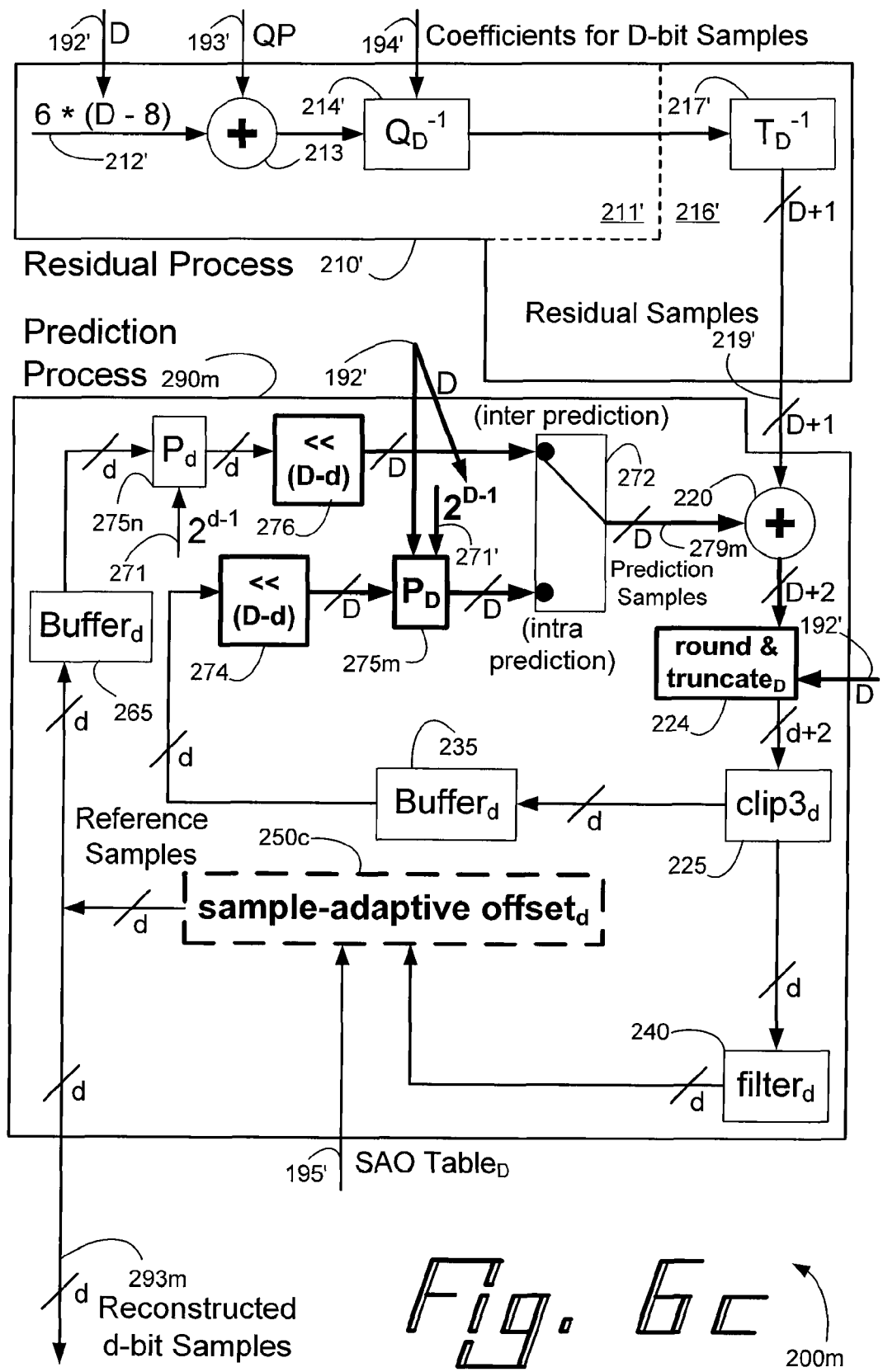

More particularly, methods 200h, 200i, and 200m of FIGS. 6a through 6c, respectively, have in common that they each depict an embodiment in which the aforementioned rounding-and/or-truncating operation is performed for both inter-prediction and intra-prediction modes. In each of these figures, round-and/or-truncate operation 224 reduces bit-depth of intermediate values from D+2 to d+2 prior clip3 operation 225; input of bit-depth value 192', which has the value D, is needed in order to determine by how many bits (D−d) the bit-depth must be reduced. It is advantageous to perform rounding-and/or-truncating operation 224 followed by a clip3 operation 225, rather than vice versa, for generating a more accurate prediction.

As a result of operation 230, the reference samples sent both to line buffer 235 for intra prediction and (perhaps via sample-adaptive offset 250c) to reference buffer 265 for inter prediction are d-bit samples. However, to be combined with (D+1)-bit residual samples 219' at addition operation 220, prediction samples must have D bits. The basic idea is to rescale d-bit intermediate samples to D-bit samples, prior to addition operation 220. As with comparable step 266 in method 200a of FIG. 3a, a simple implementation is to shift each sample two bits left, effectively padding the sample with two least significant bits, each equal to zero; this is mathematically equivalent to multiplication by $2^{D-d}$.

In particular, the padding can be performed before or after a prediction operation is performed. Furthermore, either solution can be applied independently for intra-prediction and for inter-prediction. This results in four ways to pad, three of which are shown in FIGS. 6a to 6c as methods 200h to 200k, respectively, with different outputs 293h to 293k, respectively. In method 200h, depicted in FIG. 6a, padding operation 276 follows prediction for each prediction mode, symbolized by generic prediction operation 275. In method 200i, depicted in FIG. 6b, padding operation 274 precedes generic prediction operation 275; the reconstructed d-bit samples 293i output by method 200i have better fidelity than corresponding output 293h from method 200h, because prediction performed by prediction operation 275 will be more accurate if it operates on higher-precision reference samples (even though the extra precision is D−d zero bits). Method 200m of FIG. 6c depicts an embodiment that combines aspects of FIGS. 6a and 6b. Padding 274 rescales d-bit intermediate samples to produce D-bit input to intra-prediction operation 275m and padding 276 rescales d-bit output of inter-prediction operation 275n to produce a D-bit prediction samples. Generic (i.e., either intra- or inter-) prediction samples 279m will match prediction samples 279h of method 200h in inter-prediction mode and will match prediction samples 279i of method 200i in intra-prediction mode. The skilled person will realize from what has already been disclosed that a fourth variation can be obtained by switching the pre-prediction and post-prediction padding between the two prediction modes.

Method 200m of FIG. 6c represents a reasonable balance between, at one extreme, method 200c of FIG. 4a—which performs all operations as would be done for a d-bit video, thereby losing precision from the beginning (which results in drift)—and, at the other extreme, known method 200b— which performs all operations as would be done conventionally for a D-bit video, thereby forcing the decoding device (with limited resources) to perform roughly double the work as it would to reconstruct d-bit videos encoded from d-bit source samples. Testing of method 200*m* has verified the advantages of this particular mix of d-bit and D-bit operations, in which the more computationally expensive inter-prediction operation 275*n* is performed for d-bit reference samples. Objective analysis shows a significant reduction in the distortion compared to method 200*c*. Visual inspection reveals that the DC drift observed using method 200*c* is not apparent with method 200*m*.

Figure 7A:
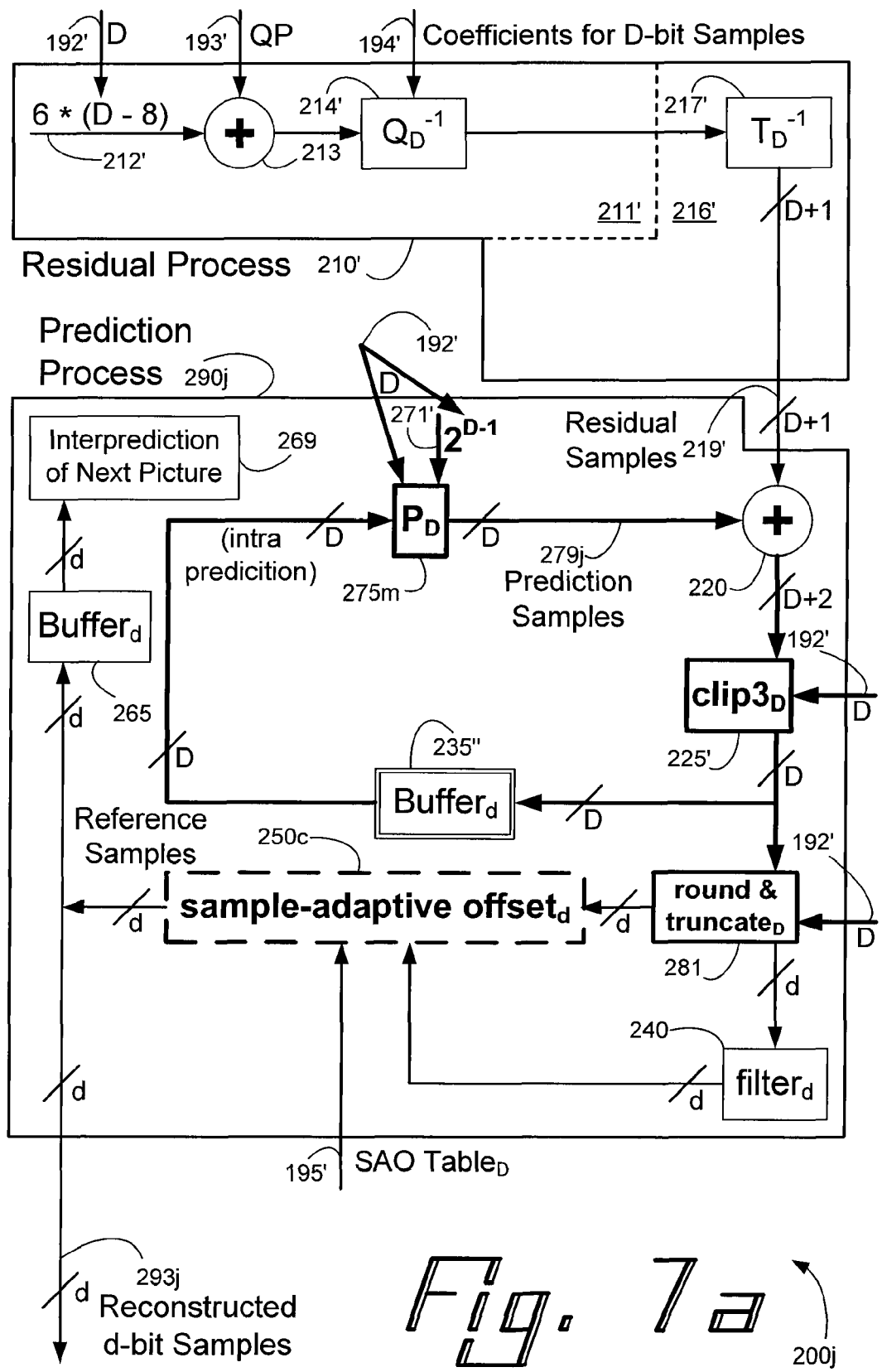
FIG. 7a, in particular, depicts an embodiment in which rounding and/or truncating is performed, only for inter-prediction, prior to an in-loop filtering operation.
Figure 7B:
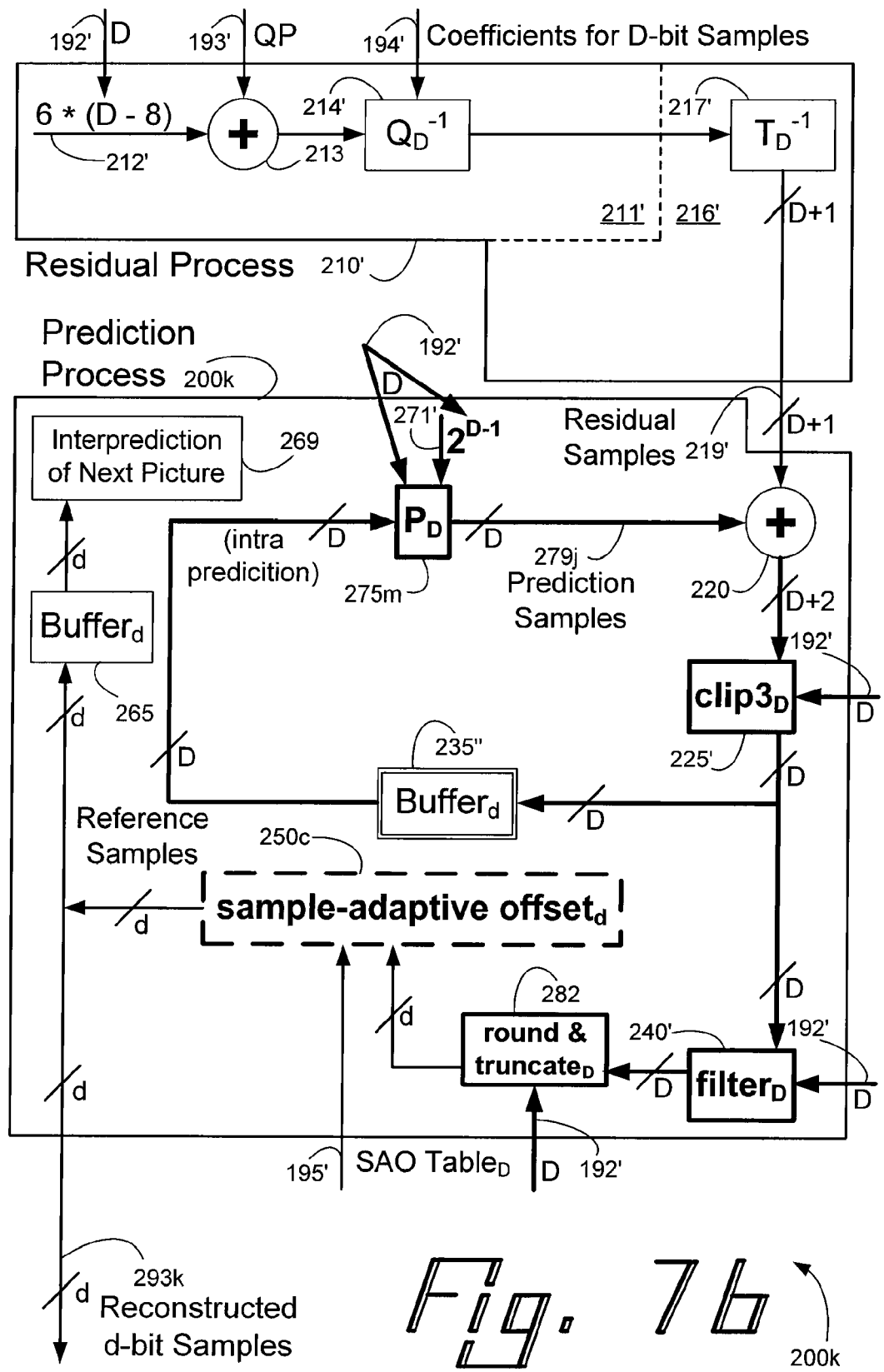
FIG. 7b, in particular, depicts an embodiment in which rounding and/or truncating is performed, only for inter prediction, after an in-loop filtering operation and prior to a sample-adaptive offset.
Figure 7C:
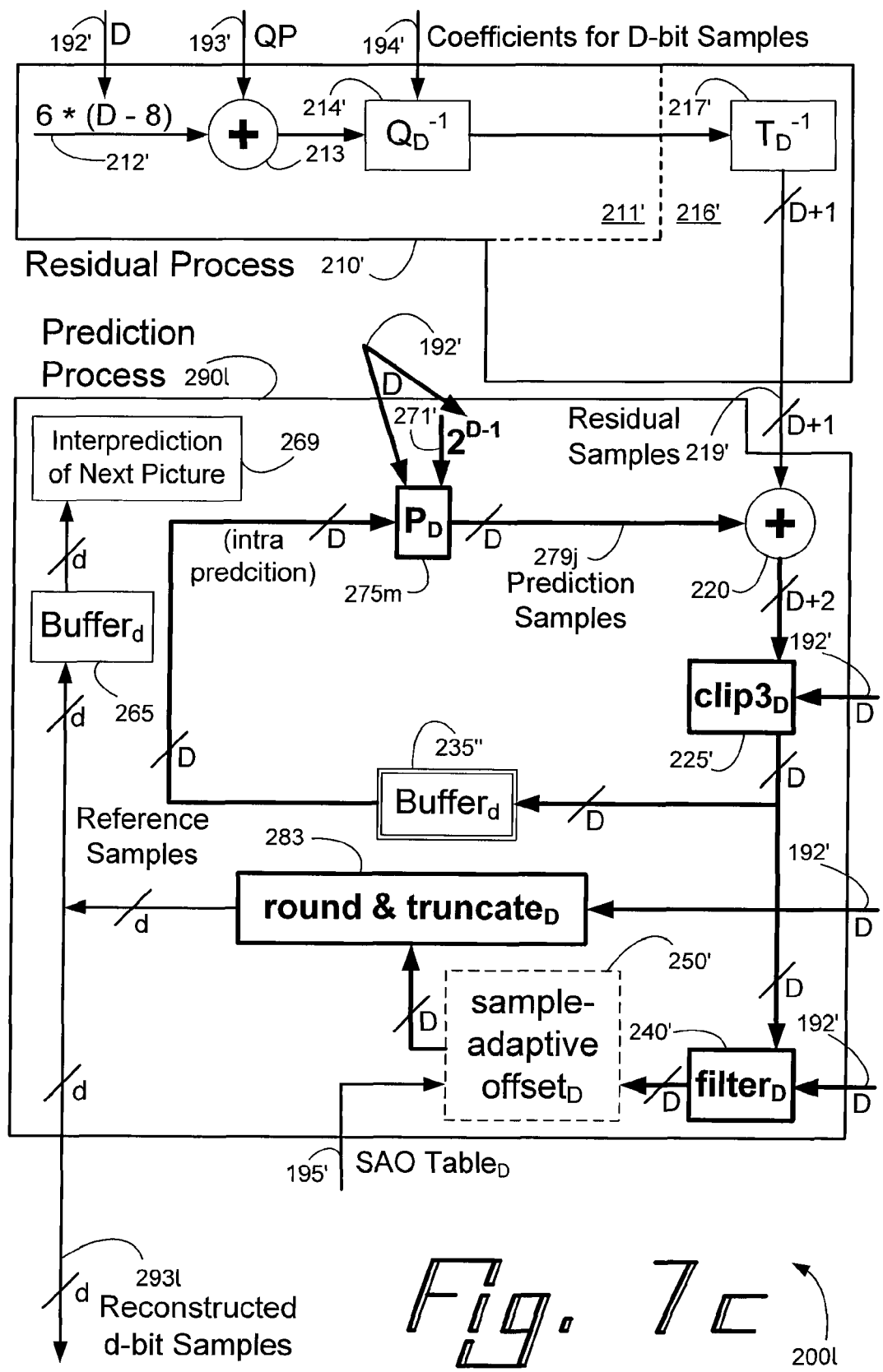

Methods 200*j* through 200*l* of FIGS. 7*a* through 7*c*, respectively, have in common that they each depict an embodiment in which the rounding-and/or-truncating operation is performed only for intra-prediction mode. In each of these figures, line buffer 235″ must do "double duty" as in methods 200*a* and 200*b* of FIGS. 3*a* and 3*b*, respectively, to handle D-bit reference samples. The complete intra-prediction loop is shown all the way to the inputting of intra-prediction samples 279*j* to addition operation 220, but the inter-prediction loop is not shown in detail beyond reference-picture buffer 265; inter prediction of next picture at step 269 is a placeholder for two different endings of the inter-prediction loop for each of methods 200*j* through 200*l*. The skilled person will realize from what has already been disclosed that (a) the d-bit output from buffer 265 is inadequate for producing prediction samples compatible with addition operation 220 without a rescaling to D bits somewhere along the path from that buffer, (b) padding by D−d bits can be performed either before (as with operation 274 in method 200*i*) or after (as with operation 276 in method 200*j*) an inter-prediction operation, and (c) therefore there are two variants of each of methods 200*j* through 200*l*.

The three (incomplete) methods, 200*j* through 200*l*, depicted in FIGS. 7*a* through 7*c* correspond to three different placements of a rounding-and/or-truncating operation; each placement results in slightly different reconstructed d-bit samples 293*j* through 293*l*, respectively. In method 200*j* of FIG. 7*a*, rounding-and/or-truncating operation 281 applies prior to in-loop filtering operation 240 (for d-bit samples). In method 200*k* of FIG. 7*b*, rounding-and/or-truncating operation 282 applies after in-loop filtering operation 240′ (for D-bit samples) and prior to modified optional SAO 250*c* (for d-bit samples). In method 200*l* of FIG. 7*c*, rounding-and/or-truncating operation 283 applies after conventional optional SAO 250′ (for D-bit samples); its d-bit output is routed both to output 293*l* and to reference-picture buffer 265 for future prediction operations. In case of these three embodiments, input of bit-depth value 192′, which has the value D, is needed in order to determine by how many bits (D−d) the bit-depth must be reduced.

Certain adaptations of the described embodiments can be made. Therefore, the above-discussed embodiments are considered to be illustrative and not restrictive. Moreover, certain of the embodiments might not lend themselves to implementation in some systems, depending on which operations within the decoder are implemented in hardware. It is anticipated that the novel embodiments disclosed herein could be adapted for use in 3-D video systems or multi-view video systems.

I claim:

1. A method of generating d-bit output samples from coefficients, in an encoded video bit-stream, encoded based on source samples having a bit-depth D, greater than d, the method comprising:

applying, to the coefficients, a residual process, the residual process including inverse-quantization and inverse-transformation processes, to compute (D+1)-bit residual samples; and applying, to the (D+1)-bit residual samples, a prediction process, the prediction process including:

generating, at a d-bit prediction operation, d-bit prediction samples;

padding the d-bit prediction samples to generate D-bit prediction samples;

adding, at an addition operation, the D-bit prediction samples to the (D+1)-bit residual samples, thereby producing (D+2)-bit first intermediate samples;

rounding and truncating the (D+2)-bit first intermediate samples, thereby producing (d+2)-bit second intermediate samples, the rounding and truncating including:

a rounding operation; and a right-shift operation subsequent to the rounding operation;

clipping the (d+2)-bit second intermediate samples, thereby producing d-bit reference samples for subsequent d-bit prediction operations; and filtering, at an in-loop filtering operation, the d-bit reference samples, thereby generating the d-bit output samples.

2. The method of claim 1, wherein the prediction process comprises:

determining that the bit-stream contains an indication that a sample-adaptive offset (SAO) is to be applied to a D-bit output from a distinct in-loop filtering operation in a distinct operational mode;

responsive to the determining, applying, instead, an SAO configured for the d-bit output samples.

3. The method of claim 2, wherein applying the SAO comprises performing lookups in a table configured for use with the d-bit output samples from the in-loop filtering operation.

4. The method of claim 1, wherein the rounding operation comprises one of: (a) rounding toward zero, (b) rounding toward negative infinity, (c) rounding toward positive infinity, (d) rounding half values toward zero, (e) rounding half values toward negative infinity, (f) rounding half values toward positive infinity, (g) rounding half values toward the nearest even value, (h) rounding half values toward the nearest odd value, (i) stochastic rounding, (j) spatial dithering, and (k) spatial dithering in combination with any one of (a) through (h).

5. A computing device comprising:

one or more processors; and a memory containing processor-executable instructions that, when executed by the one or more processors, cause the device to:

apply a residual process to the coefficients, the residual process including inverse-quantization and inverse-transformation processes, to compute (D+1)-bit residual samples; and apply a prediction process to the (D+1)-bit residual samples, the prediction process including:

generating, at a d-bit prediction operation, d-bit prediction samples;

padding the d-bit prediction samples to generate D-bit prediction samples;

adding, at an addition operation, the D-bit prediction samples to the (D+1)-bit residual samples, thereby producing (D+2)-bit first intermediate samples;

rounding and truncating the (D+2)-bit first intermediate samples, thereby producing (d+2)-bit second intermediate samples, the rounding and truncating including:
a rounding operation;
a right-shift operation subsequent to the rounding operation;
clipping the (d+2)-bit second intermediate samples, thereby producing d-bit reference samples for subsequent d-bit prediction operations; and
filtering, at an in-loop filtering operation, the d-bit reference samples, thereby generating output d-bit samples.

6. A non-transitory, processor-readable storage medium storing processor-executable instructions that, when executed by one or more processors of a computing device, cause the device to:
apply a residual process to the coefficients, the residual process including inverse-quantization and inverse-transformation processes, to compute (D+1)-bit residual samples; and
apply a prediction process to the (D+1)-bit residual samples, the prediction process including:
generating, at a d-bit prediction operation, d-bit prediction samples;
padding the d-bit prediction samples to generate D-bit prediction samples;
adding, at an addition operation, the D-bit prediction samples to the residual samples, thereby producing (D+2)-bit first intermediate samples;
rounding and truncating the (D+2)-bit first intermediate samples, thereby producing (d+2)-bit second intermediate samples, the rounding and truncating including:
a rounding operation;
a right-shift operation subsequent to the rounding operation;
clipping the (d+2)-bit second intermediate samples, thereby producing d-bit reference samples for subsequent d-bit prediction operations; and
filtering, at an in-loop filtering operation, the d-bit reference samples, thereby generating d-bit output samples.

* * * * *